US012700087B2

(12) United States Patent
Lu et al.

(10) Patent No.: US 12,700,087 B2
(45) Date of Patent: Aug. 4, 2026

(54) SYSTEMS AND METHODS FOR IMAGE GENERATION

(71) Applicant: SHANGHAI UNITED IMAGING HEALTHCARE CO., LTD., Shanghai (CN)

(72) Inventors: Yihuan Lu, Shanghai (CN); Chao Wang, Shanghai (CN); Xiaoyue Gu, Shanghai (CN); Xiaochun Xu, Shanghai (CN); Yun Dong, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 475 days.

(21) Appl. No.: 18/302,763

(22) Filed: Apr. 18, 2023

(65) Prior Publication Data

US 2023/0334664 A1 Oct. 19, 2023

(30) Foreign Application Priority Data

Apr. 18, 2022 (CN) .......................... 202210403469.4
Apr. 27, 2022 (CN) ........................ 202210490256.X
Jun. 16, 2022 (CN) .......................... 202210679920.5

(51) Int. Cl.
*G06T 7/00* (2017.01)
*G06T 3/18* (2024.01)
(Continued)

(52) U.S. Cl.
CPC .............. *G06T 7/0012* (2013.01); *G06T 3/18* (2024.01); *G06T 5/50* (2013.01); *G06T 7/11* (2017.01);
(Continued)

(58) Field of Classification Search
CPC . G06T 7/0012; G06T 7/11; G06T 7/30; G06T 3/18; G06T 5/50; G06T 7/20;
(Continued)

(56) References Cited

U.S. PATENT DOCUMENTS 5,672,877 A 9/1997 Liebig et al.
2012/0051664 A1* 3/2012 Gopalakrishnan ........ G06T 5/40
382/294

(Continued)

FOREIGN PATENT DOCUMENTS

CN 101744618 A 6/2010
CN 106485680 A 3/2017
(Continued)

OTHER PUBLICATIONS

Rao, Fan, et al. "Delayed PET imaging using image synthesis network and nonrigid registration without additional CT scan." Medical Physics 49.5, published Feb. 25, 2022 (Year: 2022).*
(Continued)

*Primary Examiner* — Oneal R Mistry
*Assistant Examiner* — Nhut Huy Pham
(74) *Attorney, Agent, or Firm* — METIS IP LLC

(57) ABSTRACT

The present disclosure provides systems and methods for image generation. The methods may include obtaining a first medical image and a second medical image of a target subject. The first medical image may be generated based on first scan data collected using a first imaging modality, and the second medical image may be generated based on second scan data collected using a second imaging modality. The methods may include generating a pseudo-second medical image by transforming the first medical image. The pseudo-second medical image may be a simulated image corresponding to the second imaging modality. The methods may further include determining registration information (Continued)

300

Obtaining a first medical image and a second medical image of a target subject, the first medical image being generated based on first scan data collected using a first imaging modality, the second medical image being generated based on second scan data collected using a second imaging modality — 302

Generating a pseudo-second medical image by transforming the first medical image, the pseudo-second medical image being a simulated image corresponding to the second imaging modality — 304

Determining registration information between the first medical image and the second medical image based on the second medical image and the pseudo-second medical image — 306

Generating a warped second medical image by warping the second medical image based on the registration information — 308

Generating a fusion image by fusing the first medical image and the warped second medical image — 310 between the first medical image and the second medical image based on the second medical image and the pseudo-second medical image.

18 Claims, 8 Drawing Sheets

(51) Int. Cl.
| | |
|---|---|
| *G06T 5/50* | (2006.01) |
| *G06T 7/11* | (2017.01) |
| *G06T 7/20* | (2017.01) |
| *G06T 7/30* | (2017.01) |
| *G06V 10/25* | (2022.01) |

(52) U.S. Cl.
CPC .................. *G06T 7/20* (2013.01); *G06T 7/30* (2017.01); *G06V 10/25* (2022.01); *G06T 2207/10081* (2013.01); *G06T 2207/10088* (2013.01); *G06T 2207/10104* (2013.01); *G06T 2207/20221* (2013.01); *G06T 2207/30096* (2013.01)

(58) Field of Classification Search
CPC . G06T 2207/10081; G06T 2207/10088; G06T 2207/10104; G06T 2207/20221; G06T 2207/30096; G06V 10/25
See application file for complete search history.

(56) References Cited

U.S. PATENT DOCUMENTS

| | | | |
|---|---|---|---|
| 2014/0128721 A1 | 5/2014 | Forthmann et al. | |
| 2015/0289848 A1 | 10/2015 | Hwang et al. | |
| 2017/0236309 A1 | 8/2017 | Arens et al. | |
| 2021/0090212 A1* | 3/2021 | Piat ........................ | G06N 3/047 |
| 2023/0056923 A1* | 2/2023 | Hsieh ..................... | G16H 15/00 |
| 2023/0172488 A1 | 6/2023 | Wan | |
| 2024/0079116 A1* | 3/2024 | Miri ....................... | G16H 30/40 |

FOREIGN PATENT DOCUMENTS

| | | | |
|---|---|---|---|
| CN | 107456236 A | 12/2017 |
| CN | 108324246 A | 7/2018 |
| CN | 108932741 A | 12/2018 |
| CN | 109919912 A | 6/2019 |
| CN | 110148192 A | 8/2019 |
| CN | 110189369 A | 8/2019 |
| CN | 111407277 A | 7/2020 |
| CN | 113129342 A | 7/2021 |
| CN | 113870178 A | 12/2021 |
| CN | 113935895 A | 1/2022 |
| CN | 114299189 A | 4/2022 |
| JP | 2005269214 A | 9/2005 |
| WO | 2021190756 A1 | 9/2021 |
| WO | 2022062590 A1 | 3/2022 |

OTHER PUBLICATIONS

Rao, Fan, et al. "Delayed PET imaging using image synthesis network and nonrigid registration without additional CT scan." Medical Physics 49.5 (Year: 2022).*

First Office Action in Chinese Application No. 202210490256.X mailed on Nov. 1, 2024, 18 pages.

First Office Action in Chinese Application No. 202210679920.5 mailed on Mar. 31, 2025, 17 pages.

First Office Action in Chinese Application No. 202210403469.4 mailed on Oct. 25, 2024, 15 pages.

The Extended European Search Report in European Application No. 23168831.8 mailed on Oct. 16, 2023, 8 pages.

Andreas Schuh, PET-/SPECT-MRI Attenuation Correction using Image Registration, Studienarbeit in Computer Science (Revised Edition), 2007, 99 pages.

Fan, Rao et al., A Novel Supervised Learning Method to Generate CT Images for Attenuation Correction in Delayed Pet Scans, Computer Methods and Programs in Biomedicine, 2020, 8 pages.

Alex Pappachen James et al., Medical Image Fusion: A Survey of the State of the Art, Information Fusion, 2014, 16 pages.

George K. Matsopoulos et al., Medical Image Registration and Fusion Techniques: A Review, Advanced Signal Processing, 2000, 37 pages.

Qian, Zongcai et al., Classification of Medical Image Registration Methods, Medical Information, 2000, 3 pages.

* cited by examiner

100

300

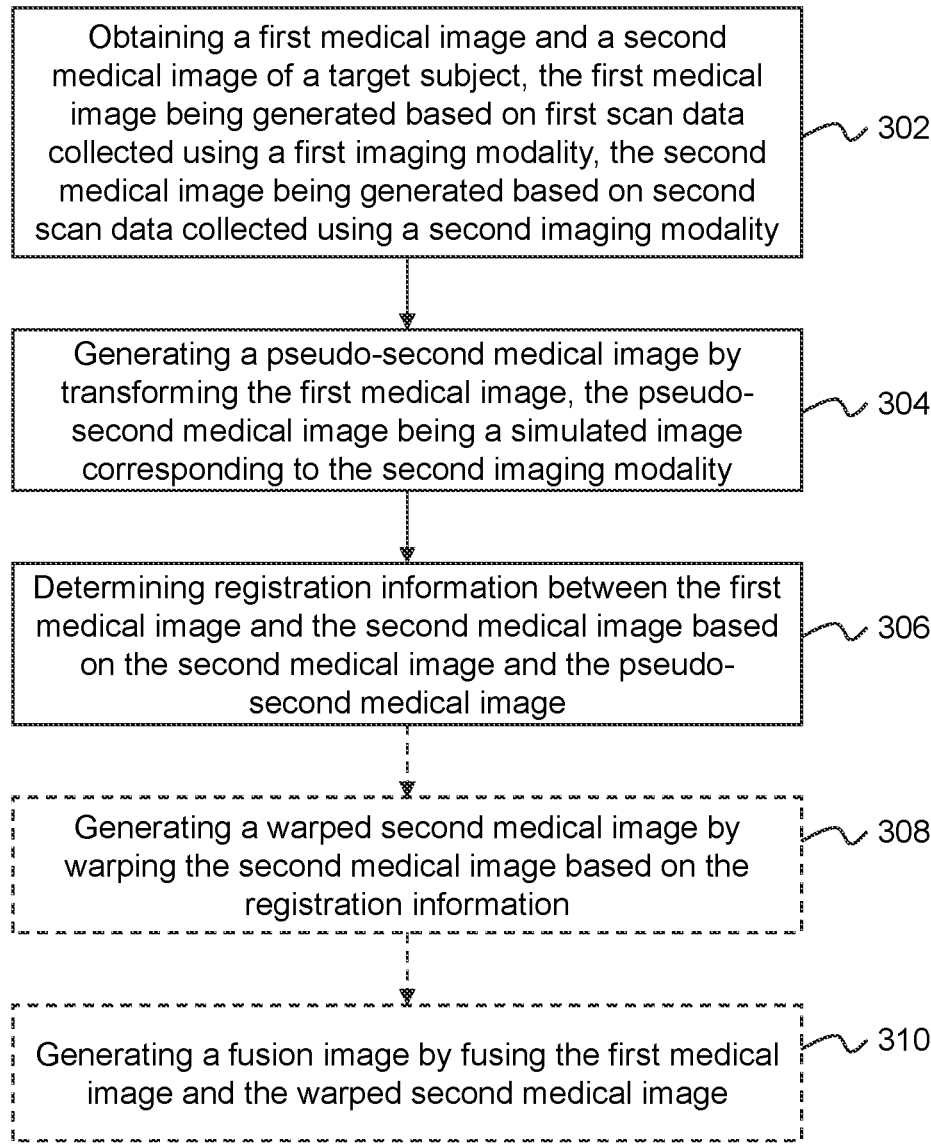

Obtaining a first medical image and a second medical image of a target subject, the first medical image being generated based on first scan data collected using a first imaging modality, the second medical image being generated based on second scan data collected using a second imaging modality     302

Generating a pseudo-second medical image by transforming the first medical image, the pseudo-second medical image being a simulated image corresponding to the second imaging modality     304

Determining registration information between the first medical image and the second medical image based on the second medical image and the pseudo-second medical image     306

Generating a warped second medical image by warping the second medical image based on the registration information     308

Generating a fusion image by fusing the first medical image and the warped second medical image     310

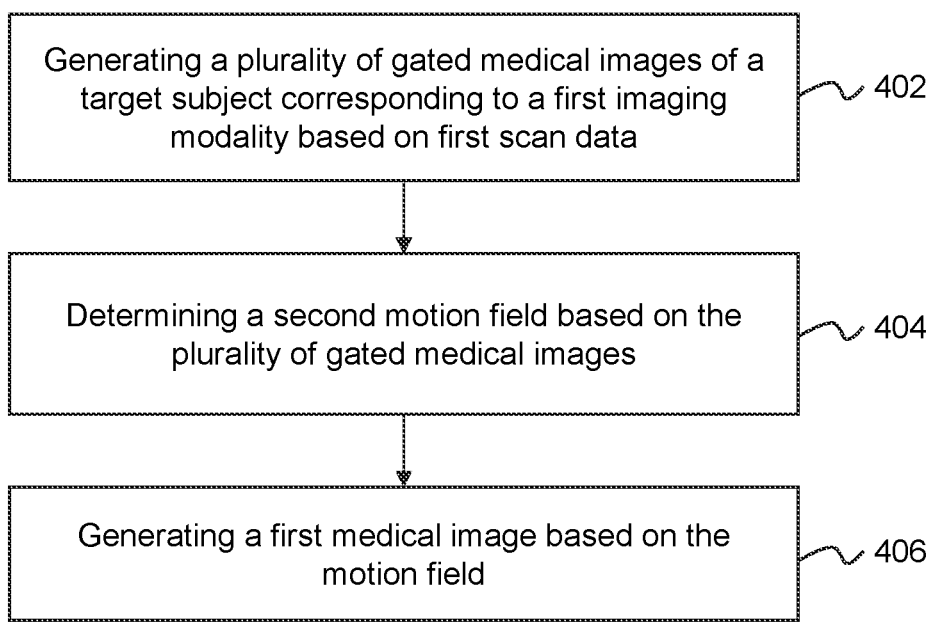

Generating a plurality of gated medical images of a target subject corresponding to a first imaging modality based on first scan data    402

Determining a second motion field based on the plurality of gated medical images    404

Generating a first medical image based on the motion field    406

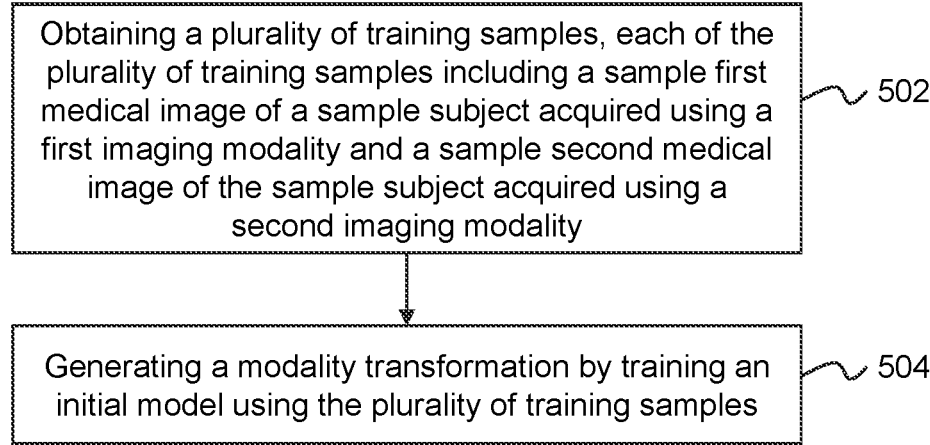

Obtaining a plurality of training samples, each of the plurality of training samples including a sample first medical image of a sample subject acquired using a first imaging modality and a sample second medical image of the sample subject acquired using a second imaging modality    502

Generating a modality transformation by training an initial model using the plurality of training samples    504

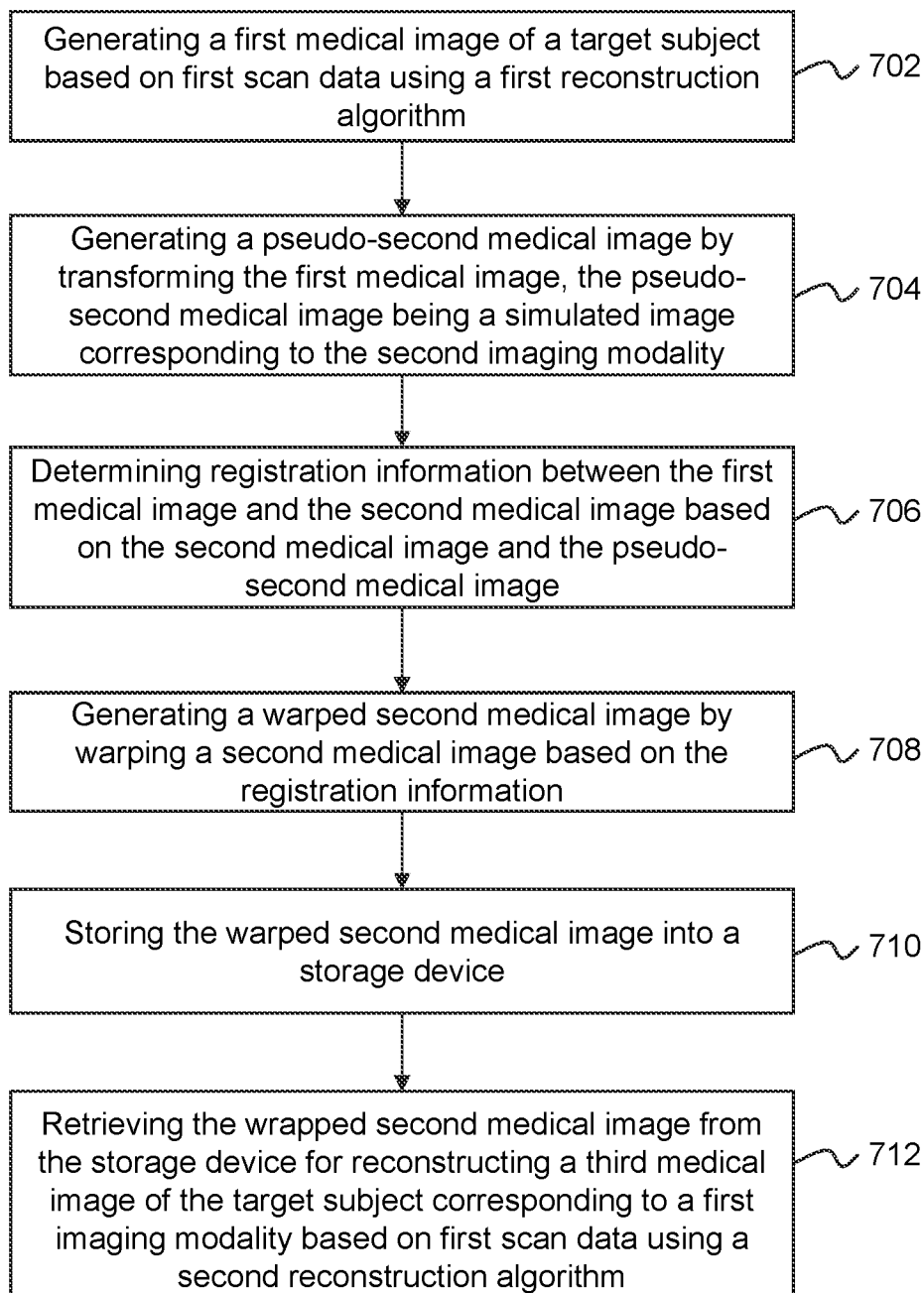

Generating a first medical image of a target subject based on first scan data using a first reconstruction algorithm 702

Generating a pseudo-second medical image by transforming the first medical image, the pseudo-second medical image being a simulated image corresponding to the second imaging modality 704

Determining registration information between the first medical image and the second medical image based on the second medical image and the pseudo-second medical image 706

Generating a warped second medical image by warping a second medical image based on the registration information 708

Storing the warped second medical image into a storage device 710

Retrieving the wrapped second medical image from the storage device for reconstructing a third medical image of the target subject corresponding to a first imaging modality based on first scan data using a second reconstruction algorithm 712

SYSTEMS AND METHODS FOR IMAGE GENERATION

CROSS-REFERENCE TO RELATED APPLICATIONS

This application claims priority to Chinese Patent Application No. 202210490256.X, filed on Apr. 27, 2022, Chinese Patent Application No. 202210679920.5, filed on Jun. 16, 2022, and Chinese Patent Application No. 202210403469.4, filed on Apr. 18, 2022, the contents of each of which are incorporated herein by reference.

TECHNICAL FIELD

The present disclosure generally relates to imaging generation, and more particularly, relates to systems and methods for image generation using multiple imaging modalities.

BACKGROUND

Medical imaging techniques have been widely used in a variety of fields including, e.g., medical treatments and/or diagnosis. To provide more information of a target subject, medical imaging techniques of different imaging modalities can be combined to scan the target subject. For example, a computed tomography (CT) image can be acquired by performing a CT scan and used to provide structural information of the target subject, and a positron emission tomography (PET) image can be acquired by performing a PET scan and used to provide functional information of the target subject. By fusing the CT image and the PET image, both the anatomical information and functional information of the target subject can be provided, thereby improving the accuracy of lesion positioning and disease diagnosis. However, when the CT scan and PET scan are performed on chest or upper abdomen of the target subject, the respiratory motion of the lungs and/or the cardiac motion of the heart of the target subject may lead to a mismatch between the CT image and the PET image. Motion correction needs to be performed in fusing medical images acquired using different imaging modalities. Further, after the medical images are fused, the image quality of the fusion medical image needs to be manually evaluated by a user, which is time-consuming, labor-intensive, and inefficient.

Therefore, it is desirable to provide systems and methods for image generation using multiple imaging modalities, which can efficiently improve the efficiency and accuracy of image generation.

SUMMARY

According to an aspect of the present disclosure, a method for image generation is provided. The method may be implemented on a computing device having at least one processor and at least one storage device. The method may include obtaining a first medical image and a second medical image of a target subject. The first medical image may be generated based on first scan data collected using a first imaging modality, and the second medical image may be generated based on second scan data collected using a second imaging modality. The method may include generating a pseudo-second medical image by transforming the first medical image. The pseudo-second medical image may be a simulated image corresponding to the second imaging modality. The method may further include determining registration information between the first medical image and the second medical image based on the second medical image and the pseudo-second medical image.

In some embodiments, the method may further include generating a warped second medical image by warping the second medical image based on the registration information; and generating a fusion image by fusing the first medical image and the warped second medical image.

In some embodiments, the obtaining a first medical image may include generating a plurality of gated medical images of the target subject corresponding to the first imaging modality based on the first scan data; determining a motion field based on the plurality of gated medical images; and generating the first medical image based on the plurality of gated medical images, the motion field, and a motion correction algorithm.

In some embodiments, the obtaining a first medical image may include generating a plurality of gated medical images of the target subject corresponding to the first imaging modality based on the first scan data; determining a motion field based on the plurality of gated medical images; and generating the first medical image based on the first scan data, the motion field, and a motion compensated image reconstruction algorithm.

In some embodiments, the generating a pseudo-second medical image by transforming the first medical image may include generating the pseudo-second medical image by inputting the first medical image into a modality transformation model. The modality transformation model may be generated by training an initial model using a plurality of training samples. Each of the plurality of training samples may include a sample first medical image of a sample subject acquired using the first imaging modality and a sample second medical image of the sample subject acquired using the second imaging modality.

In some embodiments, the first medical image may be a positron emission tomography (PET) image, and the second medical image may be one of a computed tomography (CT) image, a magnetic resonance (MR) image, and an X-ray image.

In some embodiments, the method may further include generating a target medical image of the target subject based on at least one of the first medical image, the second medical image, and the registration information; determining whether the target medical image needs to be corrected using a judgment model; and in response to determining that the target medical image needs to be corrected, correcting the target medical image. The judgment model may be a trained machine learning model.

In some embodiments, the determining whether the target medical image needs to be corrected using a judgment model may include segmenting a region of interest (ROI) from the target medical image or the second medical image; obtaining a determination result by determining whether the ROI needs to be corrected using the judgment model; and determining whether the target medical image needs to be corrected based on the determination result.

In some embodiments, the judgment model may include a first sub-model and a second sub-model. The first sub-model may be configured to determine whether the ROI includes lesion, and the second sub-model may be configured to determine whether the ROI includes image artifact. The determining whether the ROI needs to be corrected using the judgment model may include determining whether the ROI needs to be corrected by inputting the ROI into the first sub-model and the second sub-model successively; or determining whether the ROI needs to be corrected by inputting the ROI into the second sub-model and the first sub-model successively; or determining whether the ROI needs to be corrected by inputting the ROI into the first sub-model and the second sub-model simultaneously.

In some embodiments, the first medical image of the target subject may be generated based on the first scan data using a first reconstruction algorithm. The method may further include generating a warped second medical image by warping the second medical image based on the registration information; storing the warped second medical image into a storage device; and retrieving the wrapped second medical image from the storage device for reconstructing a third medical image of the target subject corresponding to the first imaging modality based on the first scan data using a second reconstruction algorithm.

In some embodiments, the method may further include in response to detecting that the second medical image and the first medical image are generated, triggering the determination of the registration information and the generation of the warped second medical image.

In some embodiments, the method may further include in response to detecting that the warped second medical image is generated, triggering the reconstruction of the third medical image.

According to another aspect of the present disclosure, a method for image generation is provided. The method may be implemented on a computing device having at least one processor and at least one storage device. The method may include obtaining a target medical image of a target subject. The method may include determining whether the target medical image needs to be corrected using a judgment model. The judgment model may be a trained machine learning model; and in response to determining that the target medical image needs to be corrected, correcting the target medical image.

In some embodiments, the obtaining a target medical image of a target subject may include obtaining a first medical image and a second medical image of the target subject, the first medical image being generated based on first scan data collected using a first imaging modality, the second medical image being generated based on second scan data collected using a second imaging modality; generating a pseudo-second medical image by transforming the first medical image, the pseudo-second medical image being a simulated image corresponding to the second imaging modality; determining registration information between the first medical image and the second medical image based on the second medical image and the pseudo-second medical image; and generating the target medical image of the target subject based on the first medical image, the second medical image, and the registration information.

In some embodiments, the first medical image of the target subject may be generated based on the first scan data using a first reconstruction algorithm. The method may further include generating a warped second medical image by warping the second medical image based on the registration information; storing the warped second medical image into a storage device; and retrieving the wrapped second medical image from the storage device for reconstructing a third medical image of the target subject corresponding to the first imaging modality based on the first scan data using a second reconstruction algorithm.

In some embodiments, the determining whether the target medical image needs to be corrected using a judgment model may include segmenting a region of interest (ROI) from the target medical image or a second medical image; obtaining a determination result by determining whether the ROI needs to be corrected using the judgment model; and determining whether the target medical image needs to be corrected based on the determination result.

According to still another aspect of the present disclosure, a method for image generation is provided. The method may be implemented on a computing device having at least one processor and at least one storage device. The method may include obtaining a first medical image of a target subject based on first scan data. The first scan data may be collected using a first imaging modality. The method may include generating a warped second medical image by warping a second medical image based on registration information between the first medical image and the second medical image. The second medical image may be generated based on second scan data collected using a second imaging modality. The method may also include reconstructing a third medical image of the target subject corresponding to the first imaging modality based on the first scan data and the warped second medical image.

In some embodiments, the reconstructing a third medical image of the target subject corresponding to the first imaging modality based on the first scan data and the warped second medical image may include storing the warped second medical image into a storage device; and retrieving the wrapped second medical image from the storage device for reconstructing the third medical image of the target subject corresponding to the first imaging modality based on the first scan data and the warped second medical image.

In some embodiments, the registration information may be determined by: generating a pseudo-second medical image by transforming the first medical image, the pseudo-second medical image being a simulated image corresponding to the second imaging modality; and determining the registration information between the first medical image and the second medical image based on the second medical image and the pseudo-second medical image.

In some embodiments, the method may further include generating a target medical image of the target subject based on the first medical image, the second medical image, and the registration information; determining whether the target medical image needs to be corrected using a judgment model, the judgment model being a trained machine learning model; and in response to determining that the target medical image needs to be corrected, correcting the target medical image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 is a flowchart illustrating an exemplary process for image generation according to some embodiments of the present disclosure;

FIG. 4 is a flowchart illustrating an exemplary process for generating a first medical image according to some embodiments of the present disclosure;

FIG. 5 is a flowchart illustrating an exemplary process for generating a modality transformation model according to some embodiments of the present disclosure;

FIG. 7 is a flowchart illustrating an exemplary process for image correction according to some embodiments of the present disclosure;

DETAILED DESCRIPTION

Figure 1:
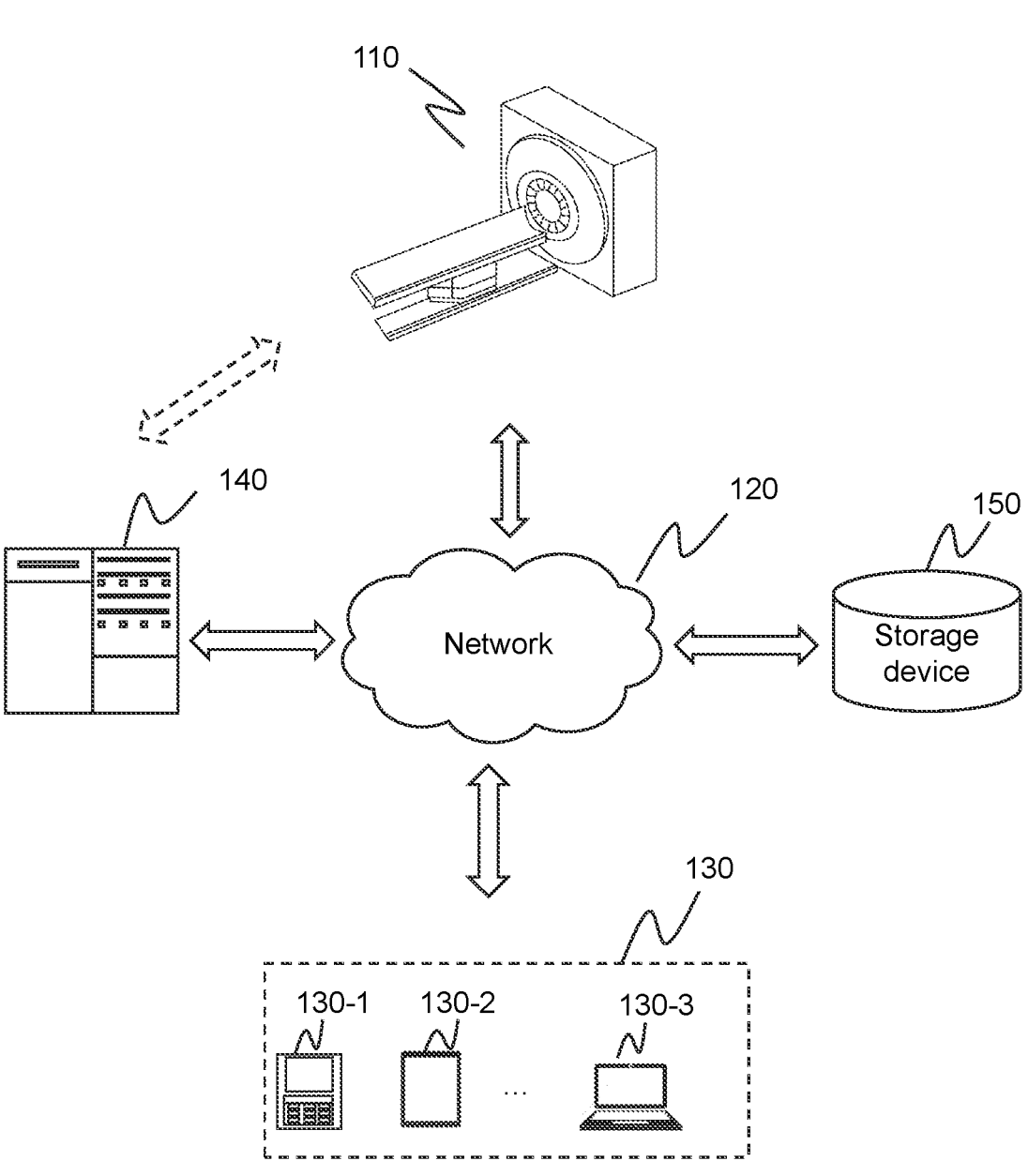
FIG. 1 is a schematic diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for non-invasive biomedical imaging/treatment, such as for disease diagnostic, disease therapy, or research purposes. In some embodiments, the systems may include an imaging system. The imaging system may include a single modality system and/or a multi-modality system. The term "modality" used herein broadly refers to an imaging or treatment method or technology that gathers, generates, processes, and/or analyzes imaging information of a subject or treatments the subject. The single modality system may include, for example, an ultrasound imaging system, an X-ray imaging system, a computed tomography (CT) system, a magnetic resonance imaging (MRI) system, an ultrasonography system, a positron emission tomography (PET) system, an optical coherence tomography (OCT) imaging system, an ultrasound (US) imaging system, an intravascular ultrasound (IVUS) imaging system, a near-infrared spectroscopy (NIRS) imaging system, or the like, or any combination thereof. The multi-modality system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a positron emission tomography-magnetic resonance imaging (PET-MR) system, a digital subtraction angiography-magnetic resonance imaging (DSA-MRI) system, etc. It should be noted that the medical system described below is merely provided for illustration purposes, and not intended to limit the scope of the present disclosure.

In the present disclosure, the subject may include a biological object and/or a non-biological object. The biological object may be a human being, an animal, a plant, or a specific portion, organ, and/or tissue thereof. For example, the subject may include the head, the neck, the thorax, the heart, the stomach, a blood vessel, a soft tissue, a tumor, a nodule, or the like, or any combination thereof. In some embodiments, the subject may be a man-made composition of organic and/or inorganic matters that are with or without life. The terms "object" and "subject" are used interchangeably in the present disclosure.

In the present disclosure, the term "image" may refer to a two-dimensional (2D) image, a three-dimensional (3D) image, or a four-dimensional (4D) image (e.g., a time series of 3D images). In some embodiments, the term "image" may refer to an image of a region (e.g., a region of interest (ROI)) of a subject. In some embodiment, the image may be a medical image, an optical image, etc.

In the present disclosure, a representation of a subject (e.g., an object, a patient, or a portion thereof) in an image may be referred to as "subject" for brevity. For instance, a representation of an organ, tissue (e.g., a heart, a liver, a lung), or an ROI in an image may be referred to as the organ, tissue, or ROI, for brevity. Further, an image including a representation of a subject, or a portion thereof, may be referred to as an image of the subject, or a portion thereof, or an image including the subject, or a portion thereof, for brevity. Still further, an operation performed on a representation of a subject, or a portion thereof, in an image may be referred to as an operation performed on the subject, or a portion thereof, for brevity. For instance, a segmentation of a portion of an image including a representation of an ROI from the image may be referred to as a segmentation of the ROI for brevity.

The present disclosure relates to systems and methods for image generation. The methods may include obtaining a first medical image and a second medical image of a target subject. The first medical image may be generated based on first scan data collected using a first imaging modality, and the second medical image may be generated based on second scan data collected using a second imaging modality. The methods may include generating a pseudo-second medical image by transforming the first medical image. The pseudo-second medical image may be a simulated image corresponding to the second imaging modality. Further, the methods may include determining registration information between the first medical image and the second medical image based on the second medical image and the pseudo-second medical image. Since the pseudo-second medical image and the second medical image have a same imaging modality, the efficiency and accuracy of the image registration between the pseudo-second medical image and the second medical image may be improved. In addition, a warped second medical image may be generated by warping the second medical image based on the registration information, and a fusion image may be generated by fusing the first medical image and the warped second medical image, which may improve the efficiency and accuracy of the image fusion between the first medical image and the warped second medical image.

The present disclosure also provides systems and methods for image correction. The methods may include obtaining a medical image of the target subject. The methods may include determining whether the medical image needs to be corrected using a judgment model. The judgment model may be a trained machine learning model. The methods may further include correcting the medical image in response to determining that the medical image needs to be corrected. Therefore, whether the medical image needs to be corrected may be automatically determined using the judgment model, which may reduce the labor consumption and the dependence on the experience of the user, and improve the efficiency of the determination of whether the medical image needs to be corrected.

FIG. 1 is a schematic diagram illustrating an exemplary imaging system 100 according to some embodiments of the present disclosure. As shown in FIG. 1, the imaging system 100 may include an imaging device 110, a network 120, one or more terminals 130, a processing device 140, and a storage device 150. In some embodiments, the imaging device 110, the processing device 140, the storage device 150, and/or the terminal(s) 130 may be connected to and/or communicate with each other via a wireless connection (e.g., the network 120), a wired connection, or a combination thereof. The connection between the components in the imaging system 100 may be variable. Merely by way of example, the imaging device 110 may be connected to the processing device 140 through the network 120, as illustrated in FIG. 1. As another example, the imaging device 110 may be connected to the processing device 140 directly. As a further example, the storage device 150 may be connected to the processing device 140 through the network 120, as illustrated in FIG. 1, or connected to the processing device 140 directly.

The imaging device 110 may be configured to generate or provide image data by scanning a target subject or at least a part of the target subject. For example, the imaging device 110 may obtain the image data of the target subject by performing a scan on the target subject. In some embodiments, the imaging device 110 may include a single modality imaging device. For example, the imaging device 110 may include a positron emission tomography (PET) device, a single-photon emission computed tomography (SPECT) device, a computed tomography (CT) device, a magnetic resonance (MR) device, a b-scan ultrasonography device, a thermal texture maps (TTM) device, a medical electronic endoscope (MEE) device, or the like. In some embodiments, the imaging device 110 may include a multi-modality imaging device. Exemplary multi-modality imaging devices may include a positron emission tomography-computed tomography (PET-CT) device, a positron emission tomography-magnetic resonance imaging (PET-MRI) device, a single-photon emission computed tomography-computed tomography (SPECT-CT) device, etc. The multi-modality scanner may perform multi-modality imaging simultaneously or in sequence. For example, the PET-CT device may generate structural X-ray CT image data and functional PET image data simultaneously or in sequence. The PET-MRI device may generate MRI data and PET data simultaneously or in sequence.

The target subject may include patients or other experimental subjects (e.g., experimental mice or other animals). In some embodiments, the target subject may be a patient or a specific portion, organ, and/or tissue of the patient. For example, the target subject may include the head, the neck, the thorax, the heart, the stomach, a blood vessel, soft tissue, a tumor, nodules, or the like, or any combination thereof. In some embodiments, the target subject may be non-biological. For example, the target subject may include a phantom, a man-made object, etc.

The network 120 may include any suitable network that can facilitate the exchange of information and/or data for the imaging system 100. In some embodiments, one or more components (e.g., the imaging device 110, the terminal 130, the processing device 140, the storage device 150, etc.) of the imaging system 100 may communicate information and/or data with one or more other components of the imaging system 100 via the network 120. For example, the processing device 140 may obtain image data from the imaging device 110 via the network 120. As another example, the processing device 140 may obtain user instructions from the terminal 130 via the network 120. In some embodiments, the network 120 may include one or more network access points.

The terminal(s) 130 may include a mobile device 130-1, a tablet computer 130-2, a laptop computer 130-3, or the like, or any combination thereof. In some embodiments, the mobile device 130-1 may include a smart home device, a wearable device, a mobile device, a virtual reality device, an augmented reality device, or the like, or any combination thereof. In some embodiments, the terminal(s) 130 may include a processing unit, a display unit, a sensing unit, an input/output (I/O) unit, a storage unit, etc. Exemplary display units may include a liquid crystal display (LCD), a light-emitting diode (LED)-based display, a flat panel display, a curved screen, a television device, a cathode ray tube (CRT), or the like, or a combination thereof. In some embodiments, the display unit may include an interactive interface that is configured to receive an input from a user. In some embodiments, the terminal(s) 130 may be part of the processing device 140.

The processing device 140 may process data and/or information obtained from one or more components (the imaging device 110, the terminal(s) 130, and/or the storage device 150) of the imaging system 100. For example, the processing device 140 may obtain a first medical image and a second medical image of a target subject. The first medical image may be generated based on first scan data collected using a first imaging modality, and the second medical image may be generated based on second scan data collected using a second imaging modality. As another example, the processing device 140 may generate a pseudo-second medical image by transforming the first medical image. The pseudo-second medical image may be a simulated image corresponding to the second imaging modality. As still another example, the processing device 140 may determine registration information between the first medical image and the second medical image based on the second medical image and the pseudo-second medical image. As yet another example, the processing device 140 may generate a warped second medical image by warping the second medical image based on the registration information, and generate a fusion image by fusing the first medical image and the warped second medical image. As yet another example, the processing device 140 may generate the first medical image by correcting a preliminary medical image corresponding to the first imaging modality based on the first scan data. As yet another example, the processing device 140 may retrieve the wrapped second medical image from the storage device 150 for reconstructing a third medical image of the target subject corresponding to the first imaging modality based on the first scan data. In some embodiments, the processing device 140 may be a single server or a server group. The server group may be centralized or distributed. In some embodiments, the processing device 140 may be local or remote. In some embodiments, the processing device 140 may be implemented on a cloud platform.

In some embodiments, the processing device 140 may be implemented by a computing device. For example, the computing device may include a processor, a storage, an input/output (I/O), and a communication port. The processor may execute computer instructions (e.g., program codes) and perform functions of the processing device 140 in accordance with the techniques described herein. The computer instructions may include, for example, routines, programs, objects, components, data structures, procedures, modules, and functions, which perform particular functions described herein. In some embodiments, the processing device 140, or a portion of the processing device 140 may be implemented by a portion of the terminal 130.

The storage device 150 may store data/information obtained from the imaging device 110, the terminal(s) 130, and/or any other component of the imaging system 100. In some embodiments, the storage device 150 may include a mass storage, a removable storage, a volatile read-and-write memory, a read-only memory (ROM), or the like, or any combination thereof. In some embodiments, the storage device 150 may store one or more programs and/or instructions to perform exemplary methods described in the present disclosure.

In some embodiments, the storage device 150 may be connected to the network 120 to communicate with one or more other components in the imaging system 100 (e.g., the processing device 140, the terminal(s) 130, etc.). One or more components in the imaging system 100 may access the data or instructions stored in the storage device 150 via the network 120. In some embodiments, the storage device 150 may be directly connected to or communicate with one or more other components in the imaging system 100 (e.g., the processing device 140, the terminal(s) 130, etc.). In some embodiments, the storage device 150 may be part of the processing device 140.

In some embodiments, the imaging system 100 may include one or more additional components and/or one or more components of the imaging system 100 described above may be omitted. Additionally or alternatively, two or more components of the imaging system 100 may be integrated into a single component. A component of the imaging system 100 may be implemented on two or more subcomponents.

Figure 2:
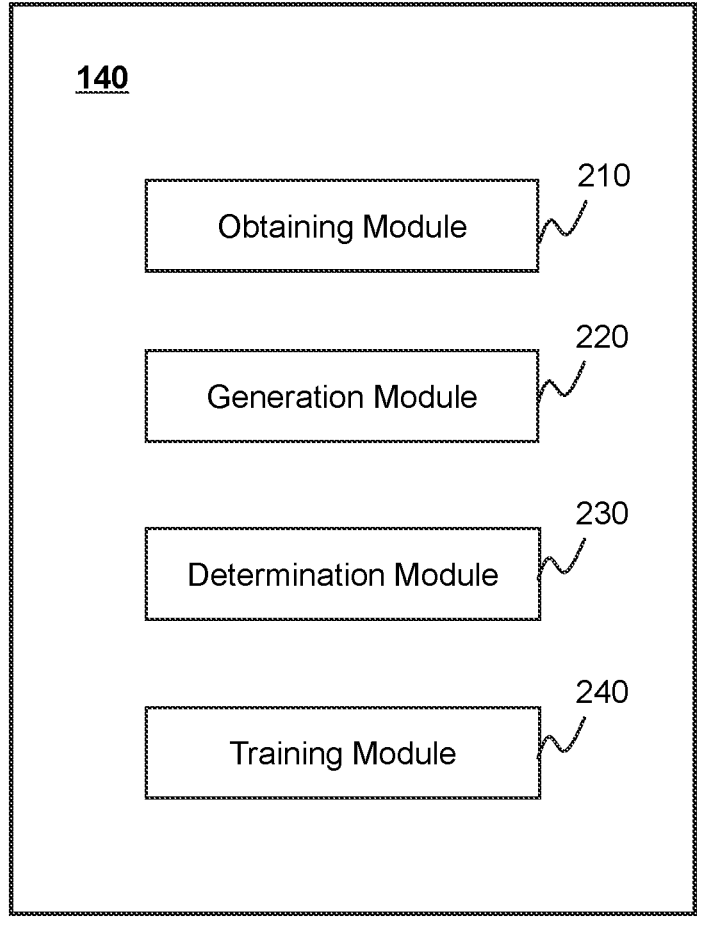
FIG. 2 is a block diagram illustrating an exemplary processing device according to some embodiments of the present disclosure.

FIG. 2 is a block diagram illustrating an exemplary processing device 140 according to some embodiments of the present disclosure. The modules illustrated in FIG. 2 may be implemented on the processing device 140. In some embodiments, the processing device 140 may be in communication with a computer-readable storage medium (e.g., the storage device 150 illustrated in FIG. 1) and execute instructions stored in the computer-readable storage medium. The processing device 140 may include an obtaining module 210, a generation module 220, a determination module 230, and a training module 240.

The obtaining module 210 may be configured to obtain a first medical image and a second medical image of a target subject. The first medical image may be generated based on first scan data collected using a first imaging modality, and the second medical image may be generated based on second scan data collected using a second imaging modality. More descriptions regarding the obtaining the first medical image and the second medical image may be found elsewhere in the present disclosure. See, e.g., operation 302 and relevant descriptions thereof.

The generation module 220 may be configured to generate a pseudo-second medical image by transforming the first medical image. The pseudo-second medical image may be a simulated image corresponding to the second imaging modality. More descriptions regarding the generation of the pseudo-second medical image may be found elsewhere in the present disclosure. See, e.g., operation 304 and relevant descriptions thereof.

The determination module 230 may be configured to determine registration information between the first medical image and the second medical image based on the second medical image and the pseudo-second medical image. The registration information may indicate a corresponding relationship between first pixels (or voxels) in the first medical image and second pixels (or voxels) in the second medical image and/or a transformation relationship between a first value of a feature of the first pixels (or voxels) in the first medical image and a second value of the feature of the second pixels (or voxels) in the second medical image. More descriptions regarding the determination of the registration information may be found elsewhere in the present disclosure. See, e.g., operation 306 and relevant descriptions thereof.

In some embodiments, the generation module 220 may further be configured to generate a warped second medical image by warping the second medical image based on the registration information, and/or generate a fusion image by fusing the first medical image and the warped second medical image. More descriptions regarding the generation of the warped second medical image and/or fusion image may be found elsewhere in the present disclosure. See, e.g., operations 308 and 310, and relevant descriptions thereof.

The training module 240 may be configured to generate one or more machine learning models used for image generation, such as, a modality transformation model, a judgment model, etc. In some embodiments, the training module 240 may be implemented on the processing device 140 or a processing device other than the processing device 140. In some embodiments, the training module 240 and other modules (e.g., the obtaining module 210, the generation module 220, the determination module 230) may be implemented on a same processing device (e.g., the processing device 140). Alternatively, the training module 240 and other modules (e.g., the obtaining module 210, the generation module 220, and/or determination module 230) may be implemented on different processing devices. For example, the training module 240 may be implemented on a processing device of a vendor of the machine learning model(s), while the other modules may be implemented on a processing device of a user of the machine learning model(s).

It should be noted that the above descriptions of the processing device 140 are provided for the purposes of illustration, and are not intended to limit the scope of the present disclosure. For persons having ordinary skills in the art, various variations and modifications may be conducted under the guidance of the present disclosure. However, those variations and modifications do not depart from the scope of the present disclosure. In some embodiments, the processing device 140 may include one or more other modules. For example, the processing device 140 may include a storage module to store data generated by the modules in the processing device 140. In some embodiments, any two of the modules may be combined as a single module, and any one of the modules may be divided into two or more units. For example, the generation module 220 may include a first generation unit, a second generation unit, and a third generation unit, wherein the first generation unit may be configured to generate the pseudo-second medical image, the second generation unit may be configured to generate the warped second medical image, and the third generation unit may be configured to generate the fusion image.

FIG. 3 is a flowchart illustrating an exemplary process for image generation according to some embodiments of the present disclosure. Process 300 may be implemented in the imaging system 100 illustrated in FIG. 1. For example, the process 300 may be stored in the storage device 150 in the form of instructions (e.g., an application), and invoked and/or executed by the processing device 140. The operations of the illustrated process presented below are intended to be illustrative. In some embodiments, the process 300 may be accomplished with one or more additional operations not described, and/or without one or more of the operations discussed. Additionally, the order in which the operations of the process 300 as illustrated in FIG. 3 and described below is not intended to be limiting.

In some embodiments, medical images of a target subject generated based on scan data collected using different imaging modalities may provide different information of the target subject. For example, a CT image or an MR image may provide more structural information of the target subject than a PET image, and the PET image may provide more functional information of the target subject than the CT image or the MR image. However, during a process of scanning the target subject using different imaging modalities, a mismatch may exist between different scan data corresponding to the different imaging modalities due to a motion (e.g., a physiological motion, a rigid motion) of the target subject. Merely by way of example, since a CT scan needs a short acquisition time and a PET scan needs a long acquisition time, the CT image may correspond to a single respiratory motion or two adjacent respiratory motions, while the PET image may correspond to a plurality of respiratory motions. A mismatch may exist between the CT image and the PET image, which reduces the efficiency and accuracy of subsequent image registration and image fusion performed on the CT image and the PET image. In order to improve the efficiency and accuracy of the image registration and the image fusion, the process 300 may be performed.

In 302, the processing device 140 (e.g., the obtaining module 210) may obtain a first medical image and a second medical image of a target subject. The first medical image may be generated based on first scan data collected using a first imaging modality, and the second medical image may be generated based on second scan data collected using a second imaging modality.

The first medical image and the second medical image may refer to different medical images that need to be fused. In some embodiments, the first medical image and the second medical image may provide different information of the target subject. For example, the first medical image may provide more functional information of the target subject than the second medical image, and the second medical image may provide more structural information (or anatomical information) of the target subject than the first medical image.

In some embodiments, the second imaging modality may be different from the first imaging modality. For example, the first imaging modality may be positron emission computed tomography (PET), and the second imaging modality may be one of computed tomography (CT), magnetic resonance (MR), and X-ray. Correspondingly, the first medical image may be a PET image, and the second medical image may be one of a CT image, an MR image, and an X-ray image.

In some embodiments, the processing device 140 may obtain the first medical image (or a preliminary medical image) or the first scan data from an imaging device for implementing the first imaging modality (e.g., a PET device, a PET scanner of a multi-modality imaging device, etc.) or a storage device (e.g., the storage device 150, a database, or an external storage) that stores the first medical image of the subject.

In some embodiments, the processing device 140 may obtain the first medical image (or a reconstructed image) by reconstructing the first scan data using a reconstruction algorithm. Exemplary reconstruction algorithms may include a filtered back projection (FBP) algorithm, an iterative reconstruction algorithm, a deep learning-based reconstruction algorithm, a maximum likelihood estimation (MLEM) algorithm, a least-squares algorithm, a maximum a posterior (MAP) algorithm based on Bayesian theory, an ordered subsets expectation maximization (OSEM) algorithm, an expectation maximization algorithm based on block iteration (BI-EM), or the like, or any combination thereof. For example, the processing device 140 may generate the first medical image based on the first scan data using a first reconstruction algorithm.

In some embodiments, the processing device 140 may obtain the first medical image by processing the preliminary medical image (or the reconstructed image) of the target subject corresponding to the first imaging modality based on the first scan data. For example, the preliminary medical image of the target subject may include a plurality of gated medical images of the target subject corresponding to the first imaging modality generated based on the first scan data. The processing device 140 may determine a motion field (also referred to as a second motion field) based on the plurality of gated medical images, and generate the first medical image based on the plurality of gated medical images, the motion field, and a motion correction algorithm. Alternatively, the processing device 140 may determine the motion field based on the plurality of gated medical images, and generate the first medical image based on the first scan data, the motion field, and a motion compensated image reconstruction algorithm. As another example, the processing device 140 may generate the first medical image by correcting the preliminary medical image. Merely by way of example, the processing device 140 may determine whether the preliminary medical image needs to be corrected using a judgment model. If the preliminary medical image needs to be corrected, the processing device 140 may generate the first medical image by correcting the preliminary medical image. If the preliminary medical image does not need to be corrected, the processing device 140 may designate the preliminary medical image as the first medical image. More descriptions regarding the generation of the first medical image may be found in elsewhere in the present disclosure (e.g., FIGS. 4 and 6 and the descriptions thereof).

In some embodiments, the obtaining of the second medical image may be obtained in a similar manner as how the first medical image is obtained as described above. For example, the processing device 140 may obtain the second medical image or the second scan data from an imaging device for implementing the second imaging modality (e.g., a CT device, an MRI scanner of a multi-modality imaging device, etc.) or a storage device (e.g., the storage device 150, a database, or an external storage) that stores the second medical image of the subject. As another example, the processing device 140 may generate the second medical image by reconstructing the second scan data.

In some embodiments, the first scan data and the second scan data may be collected by two independent scanners or two imaging components of a multi-modality scanner. For example, the first scan data may be collected by a PET scanner, and the second scan data may be collected by a CT scanner. Alternatively, the first scan data may be collected by a PET component of a PET/CT scanner, and the second scan data may be collected by a CT component of a PET/CT scanner.

In some embodiments, the processing device 140 may further preprocess the first medical image and/or the second medical image. Exemplary preprocessing operations may include image transformation, uniformization, image enhancement, image denoising, image segmentation, or the like, or any combination thereof.

In 304, the processing device 140 (e.g., the generation module 220) may generate a pseudo-second medical image by transforming the first medical image. The pseudo-second medical image may be a simulated image corresponding to the second imaging modality.

In some embodiments, the pseudo-second medical image and the second image both correspond to the second imaging modality, but are generated in different manners. For instance, the second medical image may be generated based on the second scan data collected using the second imaging modality, and the pseudo-second medical image may be generated by transforming the first medical image. In other words, the second image may be a real image corresponding to the second imaging modality, and the pseudo-second image may be a simulated image corresponding to the second imaging modality.

In some embodiments, the processing device 140 may generate the pseudo-second medical image based on the first medical image using a modality transformation model. For example, the processing device 140 may input the first medical image into the modality transformation model, and the modality transformation model may output the pseudo-second medical image corresponding to the second imaging modality. Merely by way of example, a PET image of the target subject may be input into the modality transformation model, and the modality transformation model may output a pseudo-CT image of the target subject.

In some embodiments, the modality transformation model may include a trained machine learning model, which can generate an image corresponding to the second imaging modality based on an image corresponding to the first imaging modality. Exemplary modality transformation models may include a generative adversarial network (GAN), a U-net, a pixel recurrent neural network (PixelRNN), a draw network, a variational autoencoder (VAE), or the like, or any combination thereof.

In some embodiments, the modality transformation model may be generated by the processing device 140 or another computing device by training an initial model using a plurality of training samples. Each of the plurality of training samples may include a sample first medical image of a sample subject acquired using the first imaging modality and a sample second medical image of the sample subject acquired using the second imaging modality. More descriptions regarding the generation of the modality transformation model may be found in elsewhere in the present disclosure (e.g., FIG. 5 and the descriptions thereof). In some embodiments, the modality transformation model may be previously generated and stored in a storage device (e.g., the storage device 150). The processing device 140 may retrieve the modality transformation model from the storage device and use the modality transformation model to generate the pseudo-second medical image.

In 306, the processing device 140 (e.g., the determination module 230) may determine registration information between the first medical image and the second medical image based on the second medical image and the pseudo-second medical image.

The registration information may indicate a corresponding relationship between first pixels (or voxels) in the first medical image and second pixels (or voxels) in the second medical image and/or a transformation relationship between first coordinates of the first pixels (or voxels) in the first medical image and second coordinates of the second pixels (or voxels) in the second medical image. For example, each physical point of the target subject may correspond to a first pixel in the first medical image and a second pixel in the second medical image, wherein the first pixel and the second pixel may be regarded as being corresponding to each other. As another example, for each physical point of the target subject, a first coordinate of the corresponding first pixel in the first medical image and a second coordinate of the corresponding second pixel in the second medical image may be transformed into each other through the transformation relationship.

In some embodiments, the registration information may be represented by a transformation matrix or a motion field (also referred to as a first motion field) between the first medical image and the second medical image. The first motion field may refer to a function representing the corresponding relationship and/or the transformation relationship between the first pixels (or voxels) in the first medical image and the second pixels (or voxels) in the second medical image.

In some embodiments, the processing device 140 may determine registration information between the second medical image and the pseudo-second medical image based on the second medical image and the pseudo-second medical image using an image registration algorithm. Exemplary image registration algorithms may include a grayscale-based registration algorithm, a domain-based registration algorithm, a feature-based registration algorithm, a point-based registration algorithm (e.g., an anatomic-landmark-based registration algorithm), a curve-based registration algorithm, a surface-based registration algorithm (e.g., an surface-profile-based surface profile), a spatial alignment registration algorithm, a cross-correlation registration algorithm, a mutual-information-based registration algorithm, a sequential similarity detection algorithm (SSDA), a nonlinear transformation registration algorithm, an optical flow, demons registration algorithm, B-spline registration algorithm, or the like, or any combination thereof.

In some embodiments, the processing device 140 may designate the registration information between the second medical image and the pseudo-second medical image as the registration information between the first medical image and the second medical image. Since the second medical image and the pseudo-second medical image correspond to a same imaging modality, differences between the first medical image and the second medical image caused by different imaging modalities may be reduced or eliminated, and differences between the first medical image and the second medical image caused by motions (e.g., a rigid motion, a respiratory motion) may be determined accurately. Therefore, the efficiency and accuracy of registration information determination between the first medical image and the second medical image may be improved.

In 308, the processing device 140 (e.g., the generation module 220) may generate a warped second medical image by warping the second medical image based on the registration information.

The registration information may be used to wrap the second medical image, so that corresponding pixels (or voxels) in the first medical image and the wrapped second medical image may have the same coordinate.

In 310, the processing device 140 (e.g., the generation module 220) may generate a fusion image by fusing the first medical image and the warped second medical image.

The fusion image may include information in the first medical image and information in the warped second medical image of the target subject. The fusion image may provide more accurate and comprehensive structural (anatomical) information and functional information of the target subject than a signal-modality image (e.g., the PET image, the CT image, the MR image, etc.), thereby improving the accuracy of the diagnosis.

In some embodiments, the processing device 140 may generate the fusion image by fusing the first medical image and the warped second medical image. For example, the processing device 140 may extract information (e.g., functional information) from the first medical image, and fuse the information of the first medical image into the warped second medical image to generate the fusion image. As another example, the processing device 140 may extract information (e.g., structural information) from the warped second medical image, and fuse the information of the warped second medical image into the first medical image to generate the fusion image. As still another example, the processing device 140 may generate the fusion image by inputting the first medical image and the warped second medical image into an image fusion model (e.g., a trained machine learning model). In some embodiments, the fusion of the first medical image and the warped second medical image may be performed according to an image fusion algorithm, such as, a weighted fusion algorithm, a grayscale-based fusion algorithm, a pyramid fusion algorithm, a gradient domain fusion algorithm, a wavelet transform algorithm, a structural deformation algorithm, etc.

In some embodiments, the processing device 140 may post-process the fusion image. Exemplary post-processing operations may include image enhancement, image denoising, image segmentation, image smoothing, or the like, or any combination thereof.

In some embodiments, the processing device 140 may the medical images (e.g., the first medical image, the second medical image, the warped second medical image, the fusion image) on a display interface for a user to read and/or adjust.

According to some embodiments of the present disclosure, the pseudo-second medical image may be generated by transforming the first medical image, and the registration information between the first medical image and the second medical image may be determined based on the pseudo-second medical image and the second medical image. Therefore, differences between the first medical image and the second medical image caused by different imaging modalities may be reduced or eliminated, and differences between the first medical image and the second medical image caused by motions (e.g., a rigid motion, a respiratory motion) may be focused on, which can improve the efficiency and accuracy of registration information determination between the first medical image and the second medical image.

In some embodiments, operation 310 may be omitted. In some embodiments, operations 308 and 310 may be omitted.

In some embodiments, after the registration information is determined, a target medical image of the target subject corresponding to the first imaging modality may be generated based on the first medical image, the second medical image, and the registration information. For example, a warped second medical image may be generated by performing operation 308, and the processing device 140 may generate the target medical image by correcting the first medical image based on the warped second medical image. Merely by way of example, the first medical image may include a PET image of the target subject, and the second medical image may include a CT image of the target subject. The processing device 140 may perform attenuation correction on the PET image based on the warped CT image to generate a target PET image of the target subject (or referred to as an attenuation corrected PET image).

FIG. 4 is a flowchart illustrating an exemplary process 400 for generating a first medical image according to some embodiments of the present disclosure. In some embodiments, the process 400 may be performed to achieve at least part of operation 302 as described in connection with FIG. 3.

In 402, the processing device 140 (e.g., the obtaining module 210) may generate a plurality of gated medical images of a target subject corresponding to a first imaging modality based on first scan data.

In some embodiments, since the first scan data needs to be collected using the first imaging modality for a long acquisition time, a gating technique may be used in the collection the first scan data. A gating technique refers to a technique to control data acquisition by using periodic physiological signals (e.g., electrocardiograph (ECG) signals, respiratory signals) as trigger switches to synchronize with the periodic physiological signals. Exemplary gating techniques may include a respiratory gating technique, a cardiac gating technique, or the like, or any combination thereof. The first scan data collected using the gating technique may be divided into multiple subsets corresponding to different physiological phases (e.g., different respiratory phases). Correspondingly, the plurality of gated medical images may be reconstructed based on the multiple subsets of the first scan data. Each of the gated medical images may correspond to one of the physiological phases. Merely by way of example, a plurality of gated PET images corresponding to an intermediate inspiratory phase, an end-inspiratory phase, an intermediate expiratory phase, and an end-expiratory phase of the target subject may be generated.

In 404, the processing device 140 (e.g., the obtaining module 210) may determine a second motion field based on the plurality of gated medical images.

In some embodiments, one of the gated medical images may be selected as a reference gated medical image, and the second motion field may include a motion field between the reference gated medical image and each of the other gated medical image(s). In some embodiments, the processing device 140 may determine a motion field between the reference gated medical image and a gated medical image corresponding to another physiological phase by registering the two gated medical images using a registration algorithm.

In some embodiments, as aforementioned, the plurality of gated medical images may correspond a plurality of physiological phases of the target subject. One of the physiological phases may be selected as a reference physiological phase. Merely by way of example, the end inspiratory phase may be selected from a plurality of respiratory phases as the reference physiological phase. The gated medical image of the reference physiological phase may be designated as the reference gated medical image.

In some embodiments, the processing device 140 may determine the second motion field according to a motion type of the target subject. For example, during the collection process of the first scan data, the target subject may have a rigid motion (e.g., a motion of the head, a motion of an arm, a motion of a leg, etc.). The processing device 140 may determine the second motion field by using a rigid registration algorithm (that takes an error square and/or a similarity as a target equation) to process the plurality of gated medical images. As another example, the target subject may have a non-rigid motion (e.g., a respiratory motion, a cardiac motion, etc.). The processing device 140 may determine the second motion field by using a non-rigid registration algorithm to process the plurality of gated medical images.

In 406, the processing device 140 (e.g., the obtaining module 210) may generate a first medical image based on the second motion field.

In some embodiments, the processing device 140 may generate the first medical image based on the plurality of gated medical images, the second motion field, and a motion correction algorithm. For example, the processing device 140 may obtain a superposed medical image by superposing the plurality of gated medical images, and generate the first medical image by correcting the superposed medical image based on the second motion field. As another example, for each gated medical image other than the reference gated medical image, the processing device 140 may generate a corrected (or warped) gated medical images by correcting (or warping) the gated medical image based on the motion field between the gated medical image and the reference gated medical image. The processing device 140 may then generate the first medical image by combining (e.g., superposing) each corrected gated medical image and the reference gated medical image. The first medical image generated using the motion correction algorithm may be regarded as corresponding to the reference physiological phase of the target subject.

In some embodiments, the processing device 140 may generate the first medical image based on the first scan data, the second motion field, and a motion compensated image reconstruction algorithm. For example, the processing device 140 may generate the first medical image by performing image reconstruction based on the first scan data and the second motion filed using the motion compensated image reconstruction algorithm. The first medical image generated using the motion compensated image reconstruction algorithm may be regarded as corresponding to an average of the physiological phases of the target subject. Alternatively, the first medical image generated using the motion compensated image reconstruction algorithm may be regarded as corresponding to a physiological phase when second scan data is acquired or a physiological phase nearest to the time when the second scan data is acquired.

According to some embodiments of the present disclosure, the first medical image may be generated based on the second motion field using the motion correction algorithm or the motion compensated image reconstruction algorithm, which can reduce or eliminate the effect of the motion (e.g., the rigid motion or the flexible motion) on the generation of the first medical image, thereby improving the image quality of the first medical image. For example, the generated first medical image may correspond to a reference respiratory phase or an average respiratory phase of the target subject and include no or little motion artifacts caused by the respiratory motion of the target subject. Therefore, the efficiency and accuracy of subsequent fusion between the first medical image and the warped second medical image may be improved.

FIG. 5 is a flowchart illustrating an exemplary process 500 for generating a modality transformation model according to some embodiments of the present disclosure. In some embodiments, the process 500 may be performed to achieve at least part of operation 304 as described in connection with FIG. 3.

In 502, the processing device 140 (e.g., the training module 240) may obtain a plurality of training samples. Each of the plurality of training samples may include a sample first medical image of a sample subject acquired using a first imaging modality and a sample second medical image of the sample subject acquired using a second imaging modality.

In some embodiments, for a training sample, the processing device 140 may obtain the sample first medical image of the sample subject of the training sample from an imaging device for implementing the first imaging modality (e.g., a PET device, a PET scanner of a multi-modality imaging device, etc.) or a storage device (e.g., the storage device 150, a database, or an external storage) that stores the sample first medical image of the sample subject. Similarly, the processing device 140 may obtain the sample second medical image of the sample subject of the training sample from an imaging device for implementing the second imaging modality (e.g., a CT device, an MRI scanner of a multi-modality imaging device, etc.) or a storage device (e.g., the storage device 150, a database, or an external storage) that stores the sample second medical image of the sample subject. For example, the sample first medical image and the sample second medical image of the sample subject may be obtained in a similar manner as how the first medical image and the second medical image are obtained as described in operation 302.

In some embodiments, for a training sample, the processing device 140 may further determine whether the sample first medical image and the sample second medical image satisfy a preset condition. The preset condition may include that there is no obvious mismatch between the sample first medical image and the sample second medical image caused by motion (e.g., the respiratory motion) of the sample subject. For example, a displacement of each physical point of the sample subject may be determined by registering the sample first medical image and the sample second medical image. If the displacement of each physical point is less than a displacement threshold (e.g., 1 millimeter, 5 millimeters, 10 millimeters, 15 millimeters, etc.), the sample first medical image and the sample second medical image may be deemed as satisfying the preset condition. As another example, the sample first medical image and the sample second medical image may be sent to a user for determining whether there is an obvious mismatch between the sample first medical image and the sample second medical image. If there is no obvious mismatch between the sample first medical image and the sample second medical image, the sample first medical image and the sample second medical image may be deemed as satisfying the preset condition.

In some embodiments, if the sample first medical image and the sample second medical image satisfy the preset condition, the processing device 140 may reserve the training sample. If the sample first medical image and the sample second medical image do not satisfy the preset condition, the processing device 140 may remove the training sample. Alternatively, the processing device 140 may warp the sample second medical image based on registering information between the sample second medical image and the sample first medical image to remove the mismatch between the sample first and second medical images.

In 504, the processing device 140 (e.g., the training module 240) may generate a modality transformation model by training an initial model using the plurality of training samples.

The initial model may be a machine learning model before being trained. Exemplary initial models may include a generative adversarial network (GAN), a U-net, a pixel recurrent neural network (PixelRNN), a draw network, a variational autoencoder (VAE), or the like, or any combination thereof. In some embodiments, the initial model may be a modified machine learning model. For example, the initial model may be a U-net with a residual module. By introducing the residual module, model parameter(s) of the initial model may be optimized, and the efficiency of the model training may be improved.

The training of the initial model may include an iterative process. The plurality of training samples may be used to iteratively update model parameter(s) of the initial model until a termination condition is satisfied. Exemplary termination conditions may include that a value of a loss function corresponding to the initial model is below a threshold value, a difference of values of the loss function obtained in a previous iteration and the current iteration is within a difference threshold value, a certain count of iterations has been performed, etc. For example, in a current iteration, a sample first medical image of a training sample may be input into the initial model, and the initial model may output a prediction result (e.g., a sample pseudo-second medical image corresponding to the second imaging modality).

Then, a value of the loss function may be determined to measure a difference between the prediction result and the label (e.g., a sample second medical image of the training sample). If it is determined that the termination condition is satisfied in the current iteration, the initial model may be designated as the modality transformation model; otherwise, the initial model may be further updated based on the value of the loss function.

By introducing the modality transformation model, the pseudo-second medical image may be generated by transforming the first medical image automatically, which can improve the efficiency of the generation of the pseudo-second medical image, thereby improving the efficiency of the image registration and/or the image fusion. In addition, a transformation relationship between images corresponding to different imaging modalities (e.g., the first medical image corresponding to a first imaging modality and the second medical image corresponding to a second imaging modality) may be complex. For example, when the first medical image includes artifacts, the transformation relationship may be indetectable by human or traditional determination approaches. By using the machine learning model (e.g., the modality transformation model), the analysis of the big data may enable mining the complex transformation relationship, and realize the transformation between the images corresponding to different imaging modalities.

Figure 6:
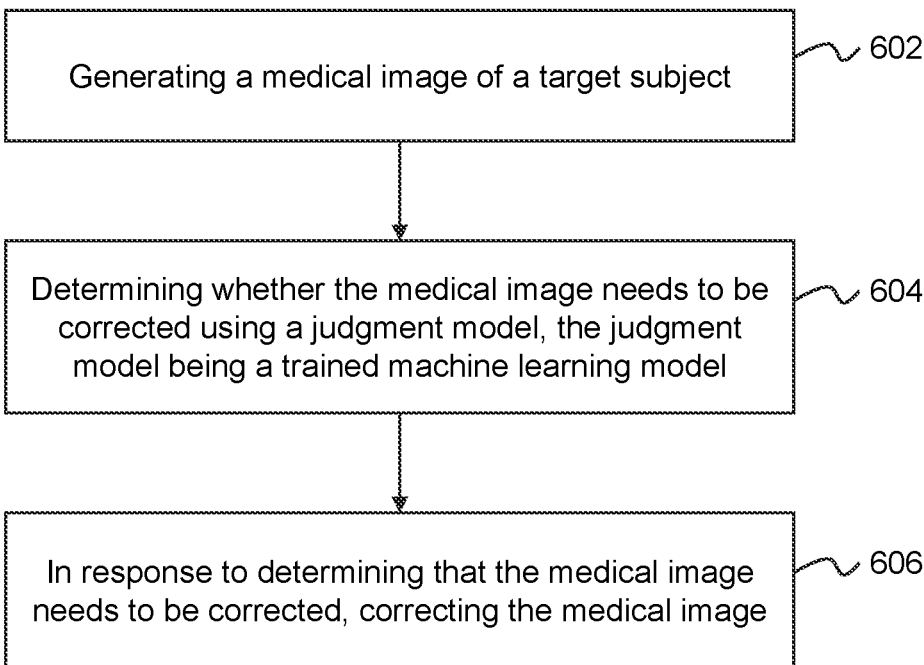
FIG. 6 is a flowchart illustrating an exemplary process for image correction according to some embodiments of the present disclosure.

FIG. 6 is a flowchart illustrating an exemplary process 600 for image correction according to some embodiments of the present disclosure. In some embodiments, the process 600 may be performed to achieve at least part of operation 302 as described in connection with FIG. 3.

When an imaging device, such as a nuclear medical device (e.g., a PET device, a SPECT device, etc.), scans a target subject, scan data (e.g., the first scan data) may be collected with a long acquisition time. The target subject always has a motion (e.g., a respiratory motion, a cardiac motion, etc.) during the collection process of the scan data, which can result in that a medical image (e.g., the first medical image) generated based on the scan data includes motion artifacts, thereby reducing the accuracy of the medical image and the diagnosis. For example, when performing a PET/CT scan on the target subject, the CT scan is short while the PET scan last for a long time, a first respiratory phase corresponding to the PET image and a second respiratory phase corresponding to the CT image may be different. In such cases, if a target PET image is generated by performing attenuation correction on the PET image based on the CT image, the target PET image may have a banana artifact (also referred to as a respiratory artifact) located at the hepatopulmonary junction.

At present, the quality control of medical images normally relies on user intervention. For example, a user needs to inspect a medical image and determine whether the medical image includes image artifact due to the motion artifacts based on his/her own experience. However, the efficiency and accuracy of the manual determination are low. In addition, when the medical image includes image artifact, the medical image may need to be corrected, so as to improve the accuracy of the medical image and the diagnosis. In order to automatically determine whether a medical image includes image artifact and/or eliminate the image artifact in the medical image, the process 600 may be performed.

In 602, the processing device 140 (e.g., the obtaining module 210) may obtain a medical image of a target subject.

The medical image may include any a medical image that might include artifacts (e.g., motion artifacts), and it may be determined whether the medical image needs to be corrected.

In some embodiments, the obtaining of the medical image may be similar to the obtaining of the first medical image as described in operation 302. For example, the processing device 140 may obtain the medical image (e.g., a preliminary medical image, a target medical image) from an imaging device for implementing a first imaging modality (e.g., a PET device, a PET scanner of a multi-modality imaging device, etc.) or a storage device (e.g., the storage device 150, a database, or an external storage) that stores the first image of the subject. As another example, the processing device 140 may obtain the medical image based on scan data using a reconstruction algorithm. As still another example, the processing device 140 may obtain a target medical image of the target subject corresponding to the first imaging modality generated based on a first medical image, a second medical image, and registration information between the first medical image and the second medical image. As still another example, the processing device 140 may obtain a target medical image of the target subject generated based on at least one of a first medical image, a second medical image, and registration information between the first medical image and the second medical image.

In 604, the processing device 140 (e.g., the determination module 230) may determine whether the medical image needs to be corrected using a judgment model. The judgment model may be a trained machine learning model.

In some embodiments, the processing device 140 may segment a region of interest (ROI) from the medical image. The ROI may include one or more organs or tissues of the target subject that needs to be checked and/or monitored. For example, the processing device 140 may segment the ROI from the medical image using an image recognition technique (e.g., an image recognition algorithm, an image segmentation algorithm, etc.) and/or based on information provided by a user (e.g., a doctor, an operator, a technician, etc.).

Merely by way of example, the processing device 140 may determine a plurality of image regions in the medical image by segmenting the medical image based on an image segmentation algorithm. Exemplary image segmentation algorithms may include a threshold-based segmentation algorithm, an edge-based segmentation algorithm, a cluster analysis-based segmentation algorithm, a wavelet transform-based segmentation algorithm, a neural network-based segmentation algorithm, or the like, or any combination thereof. The processing device 140 may further obtain the ROI by identify the plurality of image regions based on a part identification algorithm. The part identification algorithm may be configured to identify which body part (e.g., an organ or a tissue) that each of the plurality of image regions belongs, and determine the ROI from the plurality of identified image regions. For example, when four parts of the abdomen, chest, liver, and lung are identified from the medical image using the part identification algorithm, at least one of the four parts may be designated as the ROI according to actual requirement(s). Exemplary part identification algorithms may include a decision tree algorithm, a randomized deep forest algorithm, a support vector machine (SVM) algorithm, or the like, or any combination thereof. It should be understood that the ROI may be segmented from the medical image by any suitable approaches. Merely by way of example, the lungs of the target subject may be segmented from the medical image directly using a lung segmentation model.

By using the image recognition technique, the ROI may be segmented from the medical image automatically, and no user intervention may be needed, which can improve the efficiency of the determination of the ROI, and further improve the efficiency of determining whether the medical image needs to be corrected.

In some embodiments, the processing device 140 may segment the ROI from a second medical image. The segmentation of the ROI from the second medical image may be similar to the segmentation of the ROI from the medical image as described above. The second medical image may be a medical image corresponding to a second imaging modality different from a first imaging modality corresponding to the medical image. By segment the ROI from the second medical image, different information may be provided. In addition, the second medical image may provide more structural information (or anatomical information) of the target subject than the medical image, so that the segmentation of the ROI based on the second medical image may be more accurate than the segmentation of the ROI based on the medical image, which improves the accuracy of the segmentation of the ROI.

In some embodiments, the processing device 140 may obtain a determination result by determining whether the ROI needs to be corrected using the judgment model. The judgment model may be configured to generate the determination result indicating whether the ROI needs to be corrected. For example, the processing device 140 may input the ROI into the judgment model, and the judgment model may output the determination result. The determination result may include that the ROI needs to be corrected, or the ROI does not need to be corrected.

In some embodiments, the judgment model may include a convolutional neural network (CNN) model, a deep belief network (DBN) model, a stacked auto-encoder network (SAE) model, a recurrent neural network (RNN) model, or the like, or any combination thereof.

In some embodiments, the judgment model may be generated by training an initial model using a plurality of training samples. Each of the plurality of training samples may include a sample medical image of a sample subject (as a training input) and a ground truth determination result indicating whether the sample medical image needs to be corrected (as a training label). The sample medical image and the medical image may be acquired using the same imaging modality. The ground truth determination result may be determined or confirmed by a user. The generation of the judgment model may be similar to the generation of the modality transformation model as described in FIG. 5, which will not be repeated.

In some embodiments, the judgment model may include a first sub-model and a second sub-model. The first sub-model may be configured to determine whether the ROI includes lesion, and the second sub-model may be configured to determine whether the ROI includes image artifact. Correspondingly, the processing device 140 may obtain the determination result based on whether the ROI includes lesion and/or whether the ROI includes image artifact. For example, when the ROI includes lesion and the ROI includes image artifact, the determination result may be that the ROI needs to be corrected. As another example, when the ROI includes no lesion or the ROI includes no image artifact, the determination result may be that the ROI does not need to be corrected.

In some embodiments, the processing device 140 may determine whether the ROI needs to be corrected by inputting the ROI into the first sub-model and the second sub-model successively. For example, the processing device 140 may input the ROI into the first sub-model at first. If the first sub-model outputs that the ROI includes no lesion, the processing device 140 may obtain the determination result that the ROI does not need to be corrected. If the first sub-model outputs that the ROI includes lesion, the processing device 140 may input the ROI into the second sub-model. And then, if the second sub-model outputs that the ROI includes no image artifact, the processing device 140 may obtain the determination result that the ROI does not need to be corrected. If the second sub-model outputs that the ROI includes image artifact, the processing device 140 may obtain the determination result that the ROI needs to be corrected.

In some embodiments, the processing device 140 may determine whether the ROI needs to be corrected by inputting the ROI into the second sub-model and the first sub-model successively. For example, the processing device 140 may input the ROI into the second sub-model at first. If the second sub-model outputs that the ROI includes no image artifact, the processing device 140 may obtain the determination result that the ROI does not need to be corrected. If the second sub-model outputs that the ROI includes image artifact, the processing device 140 may input the ROI into the first sub-model. And then, if the first sub-model outputs that the ROI includes no lesion, the processing device 140 may obtain the determination result that the ROI does not need to be corrected. If the first sub-model outputs that the ROI includes lesion, the processing device 140 may obtain the determination result that the ROI needs to be corrected.

By disposing the first sub-model and the second sub-model in serial, when the ROI includes image artifact and lesion, it may be determined that the ROI needs to be corrected, which can avoid unnecessary correction and improve the accuracy and efficiency of the image correction. Moreover, the first sub-model and the second sub-model may be run separately, which can reduce the memory consumption and errors during the operation of the first sub-model and the second sub-model, thereby improving the safety and robustness of the first sub-model and the second sub-model.

In some embodiments, the processing device 140 may determine whether the ROI needs to be corrected by inputting the ROI into the first sub-model and the second sub-model simultaneously. If the first sub-model outputs that the ROI includes no lesion, or the second sub-model outputs that the ROI includes no image artifact, the processing device 140 may obtain the determination result that the ROI does not need to be corrected. If the first sub-model outputs that the ROI includes lesion, and the second sub-model outputs that the ROI includes image artifact, the processing device 140 may obtain the determination result that the ROI needs to be corrected.

By disposing the first sub-model and the second sub-model in parallel, the first sub-model and the second sub-model may run simultaneously to improve the efficiency of the judgment model in determining whether the ROI needs to be corrected, which can further improve the efficiency of the image correction.

It can be understandable that when the ROI includes no lesion (even if the ROI includes artifacts) or when the ROI includes no artifacts (even if the ROI includes lesion), there is no need to perform image correction on the medical image. Accordingly, the systems and methods for image correction disclosed herein can avoid unnecessary correction and improve the accuracy and efficiency of the image correction.

In some embodiments, the processing device 140 may determine whether the medical image needs to be corrected based on the determination result. For example, if the determination result is the ROI needs to be corrected, the processing device 140 may determine that the medical image needs to be corrected. As another example, if the determination result is the ROI does not need to be corrected, the processing device 140 may determine that the medical image does not need to be corrected.

In some embodiments, the first sub-model and/or the second sub-model may be a trained machine learning model. In some embodiments, the first sub-model and/or the second sub-model may include a 2D U-net model, a 3D U-net model, a U-net++ model, a U-net3+ model, a V-net model, or the like, or any combination thereof.

In some embodiments, the first sub-model and the second sub-model may be generated, respectively. For example, the first sub-model may be generated by training a first initial model using a plurality of first training samples, and the second sub-model may be generated by training a second initial model using a plurality of second training samples. Each of the plurality of first training samples may include a sample medical image of a sample ROI of a sample subject (as a training input) and a first label indicating whether the sample ROI includes lesion. Each of the plurality of second training samples may include a sample medical image of a sample ROI of a sample subject (as a training input) and a second label indicating whether the sample ROI includes image artifact. The first label and the second label may be determined or confirmed by a user. The generation of the first sub-model and/or the second sub-model may be similar to the generation of the modality transformation model as described in FIG. 5, which will not be repeated.

In some embodiments, the second sub-model may include a respiratory artifact determination component and/or a motion artifact determination component. Therefore, whether the ROI includes respiratory artifact and/or motion artifact may be determined, which can improve the accuracy, comprehensiveness, and reliability of the determination of image artifact.

If the medical image does not need to be corrected, the processing device 140 may end the process 600.

If the medical image needs to be corrected, the process 600 may proceed to operation 606.

In 606, the processing device 140 (e.g., the determination module 230) may correct the medical image. For example, the processing device 140 may correct the medical image using a correction algorithm, such as a motion artifact correction algorithm (e.g., a respiratory artifact correction algorithm).

According to some embodiments of the present disclosure, whether the medical image needs to be corrected may be automatically determined using the judgment model, which may reduce the labor consumption and the dependence on the experience of the user, and improve the efficiency of the determination of whether the medical image needs to be corrected. In addition, since the judgment model includes the first sub-model and the second sub-model, the medical image in which the ROI includes lesion but no image artifact or the ROI includes image artifact but no lesion may not need to be corrected, which can reduce the workload of the image correction, and further improve the efficiency of the determination of whether the medical image needs to be corrected.

FIG. 7 is a flowchart illustrating an exemplary process 700 for image generation according to some embodiments of the present disclosure. In some embodiments, the process 700 may be performed to achieve at least part of operation 308 as described in connection with FIG. 3.

When a PET scanner and a CT scanner are used jointly and share a same scanning bed, at least one display device may be used to determine the configuration confirmation of the PET scan and CT scan. During the imaging process, the CT scan is performed quickly on the target subject, and then the PET scan is performed. If a plurality of PET scans need to be performed (e.g., the myocardial perfusion imaging (MPI) includes one CT scan and two PET scans), a PET image generated in each PET scan may be registered with the CT image after each of the plurality of PET scans is performed. Therefore, for a single display device, a user needs to repeatedly switch between an examination interface and an image review interface to perform the image registration, which is complicated, time-consuming, and inefficient.

At present, a dual display device may be used in the PET-CT device to avoid repeatedly switching between the examination interface and the image review interface. That is, one display device may be used to display the examination interface, and another display device may be used to display the image review interface for the image registration, which can improve the efficiency of the image registration. However, the use of two display devices increases the cost of the PET-CT device.

In order to avoid repeatedly switching between the examination interface and the image review interface when one display device is used, the process 700 may be performed.

In 702, the processing device 140 (e.g., the obtaining module 210) may generate a first medical image of a target subject based on first scan data collected using a first imaging modality, wherein the first medical image is generated using a first reconstruction algorithm.

For example, the first scan data may include PET data, and the first medical image may be a PET image of the target subject. Exemplary first reconstruction algorithms may include a filtered back projection (FBP) algorithm, an iterative reconstruction algorithm, a deep learning-based reconstruction algorithm, a maximum likelihood estimation (MLEM) algorithm, a least-squares algorithm, a maximum a posterior (MAP) algorithm based on Bayesian theory, an ordered subsets expectation maximization (OSEM) algorithm, an expectation maximization algorithm based on block iteration (BI-EM), or the like, or any combination thereof.

More descriptions regarding the first medical image may be found elsewhere in the present disclosure. See, e.g., operation 702 and relevant descriptions thereof.

In 704, the processing device 140 may generate a second medical image of the target subject based on second scan data collected using a second imaging modality. For example, the second scan data may include CT data, and the second medical image may be a CT image of the target subject. More descriptions regarding the second medical image may be found elsewhere in the present disclosure. See, e.g., operation 702 and relevant descriptions thereof.

In 706, the processing device 140 may determine registration information between the first medical image and the second medical image.

For example, the processing device 140 may determine the registration information by registering the second medical image with the first medical image. As another example, the processing device 140 may perform operation 304 to generate a pseudo-second medical image, and perform operation 306 to determine the registration information based on the second medical image and the pseudo-second medical image.

In 708, the processing device 140 (e.g., the obtaining module 210) may generate a warped second medical image by warping the second medical image based on the registration information.

Operation 708 may be performed in a similar manner as operation 308, and the descriptions thereof are not repeated here.

In some embodiments, the processing device 140 may detect whether the second medical image and the first medical image are generated. For example, the processing device 140 may detect whether the second medical image and the first medical image are generated continuously or periodically (e.g., every 5 minutes, every 10 minutes, every 15 minutes, every 20 minutes, every 30 minutes, etc.) after the PET/CT scan is performed. If the second medical image and the first medical image are generated, the processing device 140 may trigger the determination of the registration information and the generation of the warped second medical image.

In some embodiments, when the warped second medical image is stored, the processing device 140 may determine whether the warped second medical image can be used for an offline reconstruction. For example, the processing device 140 may add a label for the warped second medical image based on a preset rule, and the label may indicate that whether the warped second medical image can be used for an offline reconstruction. As another example, a user may add the label via a user terminal that displays the warped second medical image.

In 710, the processing device 140 (e.g., the obtaining module 210) may store the warped second medical image into a storage device.

The storage device may be any device that can be used to store the warped second medical image. For example, the storage device may be the storage device 150, a database, or an external storage.

In 712, the processing device 140 (e.g., the obtaining module 210) may retrieve the warped second medical image from the storage device for reconstructing a third medical image of the target subject corresponding to the first imaging modality based on the first scan data using a second reconstruction algorithm.

In some embodiments, the second reconstruction algorithm may be the same as or different from the first reconstruction algorithm. For example, both the first reconstruction algorithm and the second reconstruction algorithm may be the FBP algorithm. As another example, the first reconstruction algorithm may be the FBP algorithm, and the second reconstruction algorithm may be the iterative reconstruction algorithm. In some occasion, one set of scan data may need to be reconstructed multiple times for certain purposes. For example, the first scan data may be reconstructed using different reconstruction algorithms to generate medical images that can provide different information.

In some embodiments, the processing device 140 may detect whether the warped second medical image is generated. For example, the processing device 140 may detect whether the warped second medical image is generated continuously or periodically (e.g., every 5 minutes, every 10 minutes, every 15 minutes, every 20 minutes, every 30 minutes, etc.) after the PET/CT scan is performed. If the warped second medical image is generated, the processing device 140 may trigger the reconstruction of the third medical image.

In some embodiments, before the first medical image is generated (or the operation 702 is performed), the processing device 140 may obtain a scout image to obtain an area where the target subject is located. The scout image may refer to an image for determining information used to guide the implementation of the imaging. For example, before the first scan data and the second scan data are collected, the processing device 140 may obtain the scout image of the target subject to determine a location of the target subject.

In some embodiments, the processing device 140 may cause a second imaging device to perform a positioning scan (i.e., a pre-scan) to obtain the scout image of the target subject. The second imaging device may be the same as or different from the imaging device (also referred to as a first imaging device) that is used to collect the first scan data and/or the second scan data as described in operation 302. Merely by way of example, the first imaging device may be a PET scanner, and the second imaging device may be a CT scanner. Optionally, the PET scanner and the CT scanner may be integrated into a PET/CT imaging device. In some embodiments, the scout image may include one or more plane images obtained by performing plain scan(s) (or referred to as fast scan(s)) on the target subject using the CT scanner. Exemplary plane images may include an antero-posterior image and a lateral image. In some embodiments, the target subject may be asked to hold the same posture during the positioning scan.

In some embodiments, a plurality of third medical images need to be generated. For the plurality of third medical images, the same warped second medical image may be used. For example, when the plurality of third medical images are generated, the processing device 140 may retrieve the same wrapped second medical image from the storage device for constructing the plurality of third medical images. Therefore, an offline reconstruction may be realized based on the wrapped second medical image. As another example, when the plurality of third medical images is generated, the processing device 140 may generate the wrapped second medical image, and use the corresponding wrapped second medical image for constructing the third medical image. Therefore, an online reconstruction may be realized based on the wrapped second medical image.

For illustration purposes, a process of a myocardial perfusion imaging (MPI) may be taken as an example. It should be noted that, the description of the process of MPI is merely for illustration, and is not intended to limit the scope of the present disclosure. For example, the image generation methods disclosed herein may be used to detect the metastases and relapses of tumors. As another example, the image generation methods disclosed herein may be used to monitor the therapeutic effect. As still another example, the image generation methods disclosed herein may be used to determine the position of lesion.

Figure 8A:
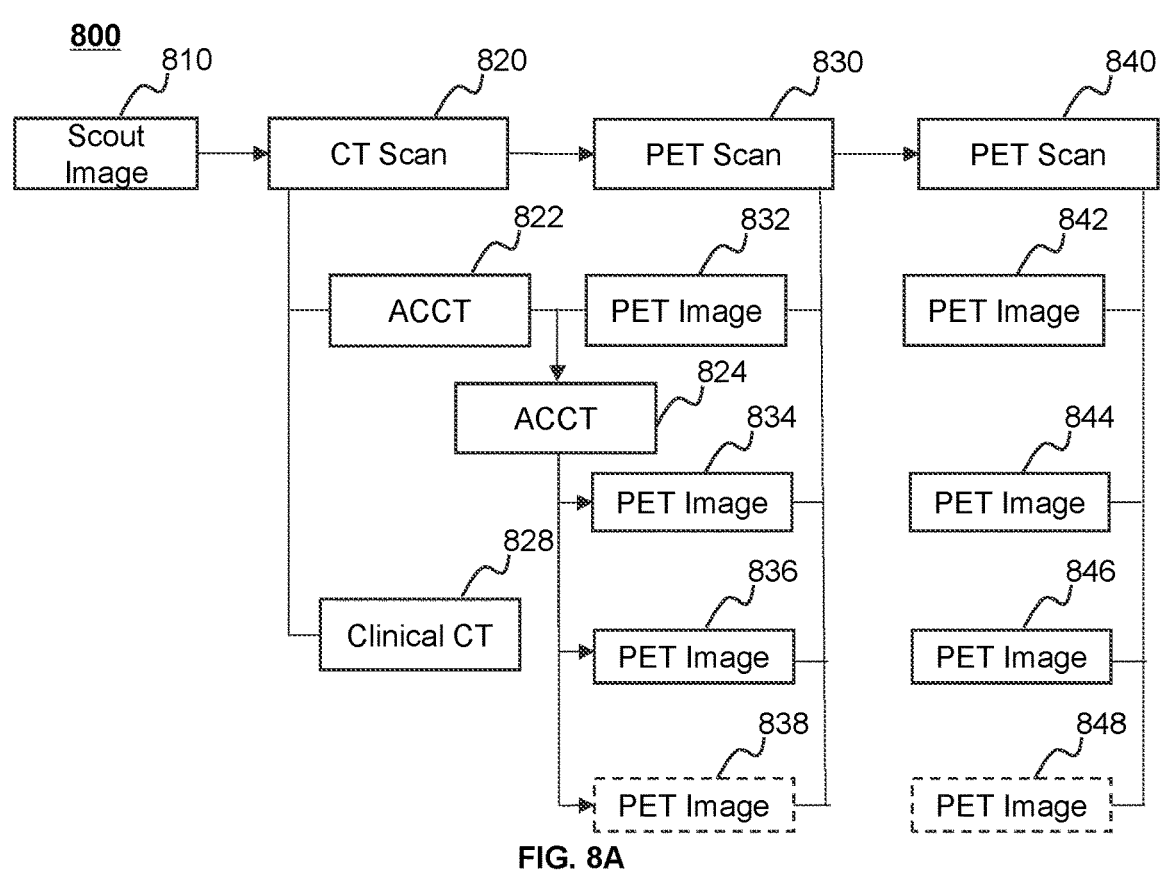
FIG. 8A is a schematic diagram illustrating an exemplary process for image generation according to some embodiments of the present disclosure.
Figure 8B:
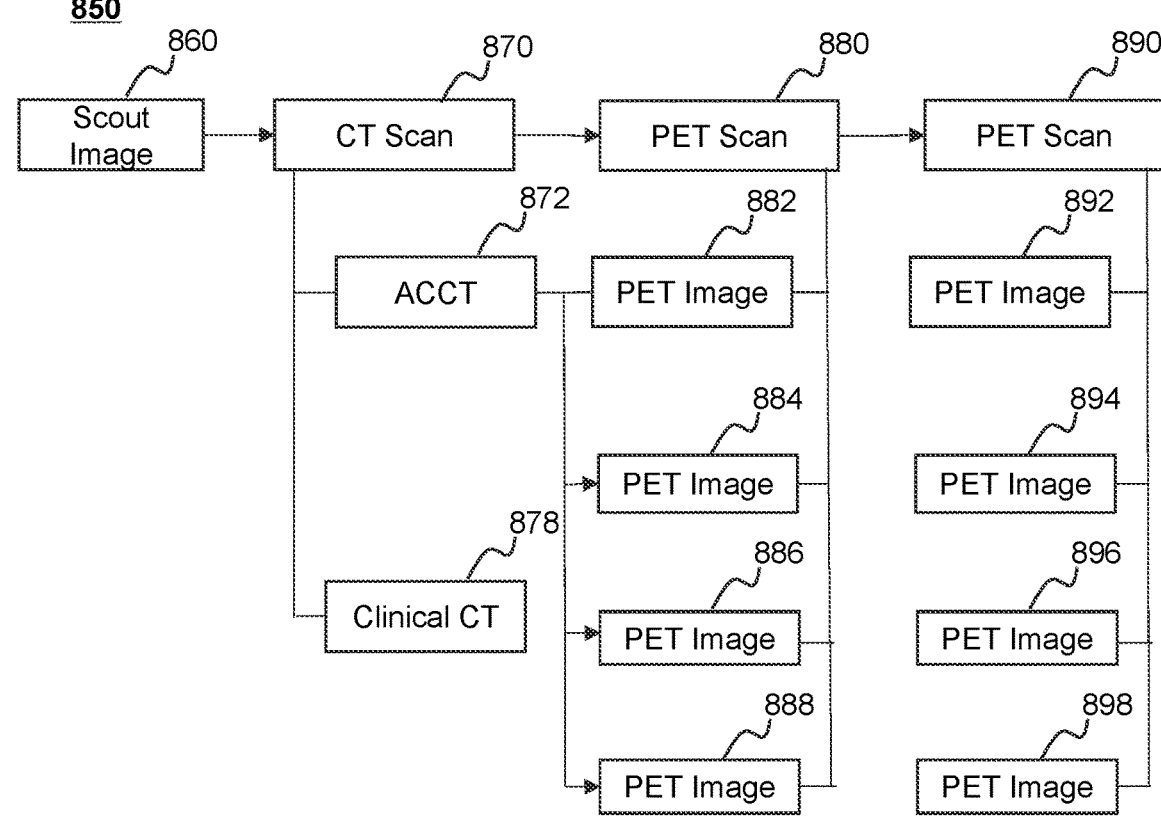
FIG. 8B is a schematic diagram illustrating an exemplary process for image generation according to some embodiments of the present disclosure.

Merely by way of example, referring to FIGS. 8A and 8B, FIG. 8A is a schematic diagram illustrating an exemplary process 800 for generating a third image according to some embodiments of the present disclosure. FIG. 8B is a schematic diagram illustrating another exemplary process 850 for generating a third image according to some embodiments of the present disclosure.

As illustrated in FIGS. 8A and 8B, the process of MPI may include one CT scan and two PET scans, and each of the two PET scans may include three PET reconstructions. It should be noted that the counts of CT scan, PET scans, and PET reconstructions are merely provided for illustration, and is not intended to limit the scope of the present disclosure. For example, the counts of CT scans, PET scans, and PET reconstructions may be any positive integer (e.g., 2, 3, 4, 5, 8, 10, etc.).

The CT scan may be used to obtain a second medical image or a warped second medical image. A first PET scan of the two PET scans may be used to obtain a first target medical image of the myocardium in the resting state, and a second PET scan of the two PET scans may be used to obtain a second target medical image of the myocardium in the loading state. A first PET reconstruction of the three PET reconstructions may be used to obtain an uncorrected first medical image of the resting state that is used to register with the warped second medical image. A second PET reconstruction of the three PET reconstructions may be used to obtain a target medical image of a dynamic sequence. A third PET reconstruction of the three PET reconstructions may be used to obtain a target medical image of a gating sequence. According to the process 700, the warped second medical image may be determined based on the uncorrected first medical image and the second medical image, and may be used for reconstructing a subsequent medical image (e.g., the target medical image of the dynamic sequence, the target medical image of the gating sequence, etc.) (i.e., one or more third medical images) of the target subject. In some embodiments, since the first PET reconstruction and the second PET reconstruction are performed based on same scan data, a portion of data generated during the first PET reconstruction may be used in the second PET reconstruction, which can improve the efficiency of the image reconstruction.

As illustrated in FIG. 8A, after a scout image 810 is obtained, a CT scan 820 may be performed, and an attenuation corrected CT (ACCT) image 822 and a clinical CT image 828 may be generated based on CT data collected in the CT scan. A PET scan 830 may be performed after the CT scan 820. A PET image 832 may be obtained by performing the first PET reconstruction on PET scan data. The PET image 832 may be regarded as an initial PET image without attenuation correction. An ACCT image 824 may be generated based on the ACCT image 822 and the PET image 832 (e.g., by performing operations, such as an attenuation correction operation, a fusion operation, etc.). The ACCT image 824 may also be referred to as a reference image (or the warped second medical image). Further, the ACCT image 824 may be retrieved to reconstruct a PET image 834 and a PET image 836, respectively. The PET images 834, and 836 may be reconstructed using different reconstruction algorithms. As used herein, the PET image 834 may be generated based on PET data collected using a dynamic sequence, and the PET image 836 may be generated based on PET data collected using a gating sequence. In some embodiments, the first PET scan may include more three PET reconstructions. As illustrated in FIG. 8A, the ACCT image 824 may be further retrieved to reconstruct a PET image 838, wherein the PET image 838 may be generated based on PET data collected using a sequence other than the dynamic sequence or the gating sequence. Therefore, by using the ACCT image 824, a plurality of PET reconstructions may be performed. In some embodiments, a PET scan 840 may be performed after the PET scan 830, and a PET image 842, a PET image 844, a PET image 846, and a PET image 848 may be generated based on PET scan data collected during the PET scan 840 in a similar manner as the generation of the PET image 832, the PET image 834, the PET image 836, and the PET image 838.

In some embodiments, the ACCT image 824 in the process 800 may be generated immediately after the PET scan 830 or before the reconstruction of the PET image 834.

As illustrated in FIG. 8B, after a scout image 860 is obtained, a CT scan 870 may be performed, and an attenuation corrected CT (ACCT) image 872 and a clinical CT image 878 may be generated based on CT data collected in the CT scan. A PET scan 880 may be performed after the CT scan 880. A PET image 882 may be obtained by performing the first PET reconstruction on PET scan data. The PET image 882 may be regarded as an initial PET image without attenuation correction. Before a PET image 884, a PET image 886, and/or a PET image 888 are reconstructed, a reference image (or the warped second medical image) may be retrieved. The PET images 884, 886, and 888 may be reconstructed using different reconstruction algorithms. As used herein, the PET image 884 may be generated based on PET data collected using a dynamic sequence, the PET image 886 may be generated based on PET data collected using a gating sequence, the PET image 888 may be generated based on PET data collected using a sequence other than the dynamic sequence or the gating sequence. In some embodiments, a PET scan 890 may be performed after the PET scan 880, and a PET image 892, a PET image 894, a PET image 896, and a PET image 898 may be generated based on PET scan data collected during the PET scan 890 in a similar manner as the generation of the PET image 882, the PET image 884, the PET image 886, and the PET image 888.

By detecting whether the second medical image and the first medical image are generated and/or whether the warped second medical image is generated, the registration information, the warped second medical image, and the third medical image may be obtained automatically, which can reduce the labor and time consumption, and improve the efficiency of the reconstruction of the third medical image. In addition, the determination of the registration information, the generation of the warped second medical image, the reconstruction of the third medical image may be automatically triggered, which can avoid the user from repeatedly switching between the examination interface and the image review interface, thereby improving the efficiency of the image registration. Moreover, the warped second medical image may be stored in the storage device, and may be retrieved to reconstruct the third image, which can realize the online reconstruction and/or the offline reconstruction, thereby improving the convenience of the image reconstruction.

It should be noted that the descriptions of the processes 300-700 are provided for the purposes of illustration, and are not intended to limit the scope of the present disclosure. For persons having ordinary skills in the art, various variations and modifications may be conducted under the teaching of the present disclosure. For example, the processes 300-700 may be accomplished with one or more additional operations not described, and/or without one or more of the operations discussed. Additionally, the order in which the operations of the processes 300-700 is not intended to be limiting. However, those variations and modifications may not depart from the protection of the present disclosure.

Figure 9:
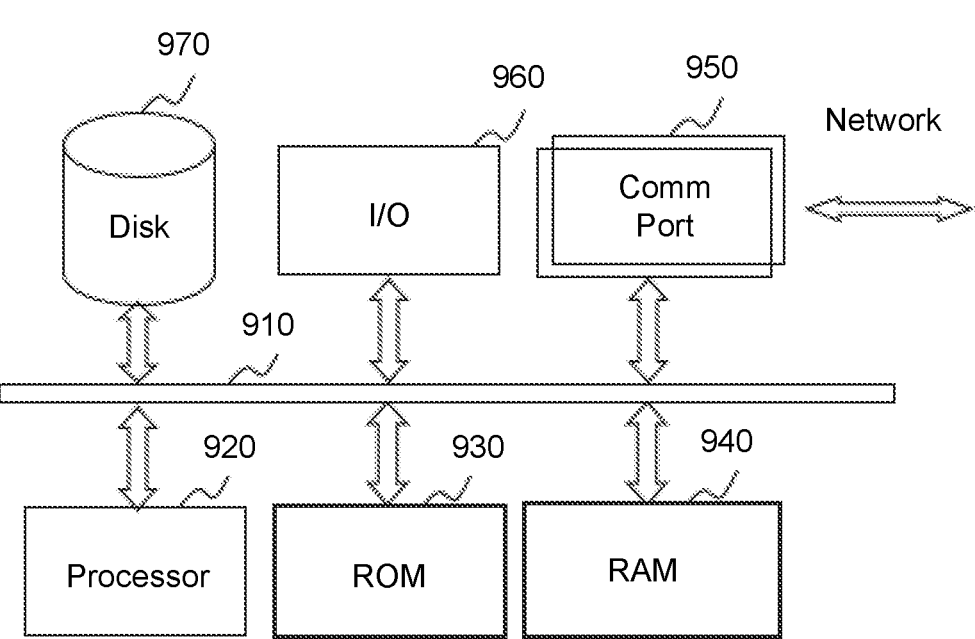
FIG. 9 is a schematic diagram illustrating an exemplary computing device according to some embodiments of the present disclosure.

FIG. 9 is a schematic diagram illustrating an exemplary computing device 900 according to some embodiments of the present disclosure.

In some embodiments, one or more components of the imaging system 100 may be implemented on the computing device 900. For example, a processing engine 912 may be implemented on the computing device 900 and configured to implement the functions and/or methods disclosed in the present disclosure.

The computing device 900 may include any components used to implement the imaging system 100 described in the present disclosure. For example, the processing device 140 may be implemented through hardware, software program, firmware, or any combination thereof, on the computing device 900. For illustration purposes, only one computer is described in FIG. 9, but computing functions related to the imaging system 100 described in the present disclosure may be implemented in a distributed fashion by a group of similar platforms to spread the processing load of the imaging system 100.

The computing device 900 may include a communication port 950 connected to a network to achieve data communication. The computing device 900 may include a processor (e.g., a central processing unit (CPU)) 920, which can execute program instruction(s) in the form of one or more processors. The computing device 900 may also include an internal bus 910, different program memories, and different data memories. For example, a hard disk 970, a read only memory (ROM) 930, or a random access memory (RAM) 940 may be used to store various types of data files that are processed and/or transmitted by the computer. The computing device 900 may include procedure instructions performed by the processor 920 stored in a non-temporary storage medium (e.g., the ROM 930, the RAM 940, other types of non-temporary storage media, etc.). The method and/or process of the present disclosure may be implemented in a program instruction. The computing device 900 may also include input/output components 960 to support the input/output between the computer and other components. The computing device 900 may also receive programs and data in the present disclosure through network communication.

Merely for illustration, only one processor is described in FIG. 9. However, it should be noted that the computing device 900 in the present disclosure may also include multiple processors. Thus operations and/or method steps that are performed by one processor as described in the present disclosure may also be jointly or separately performed by the multiple processors. For example, if the processor of the computing device 900 in the present disclosure executes both operation A and operation B, it should be understood that operation A and operation B may also be performed by two or more different processors jointly or separately (e.g., a first processor executes operation A and a second processor executes operation B, or the first and second processors jointly execute operations A and B).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image generation implemented on a computing device having at least one processor and at least one storage device, the method comprising:

obtaining a first medical image and a second medical image of a target subject, the first medical image being generated based on first scan data collected using a first imaging modality, the second medical image being generated based on second scan data collected using a second imaging modality;

generating a pseudo-second medical image by transforming the first medical image, the pseudo-second medical image being a simulated image corresponding to the second imaging modality;

determining registration information between the first medical image and the second medical image based on the second medical image and the pseudo-second medical image;

generating a target medical image of the target subject based on the first medical image, the second medical image, and the registration information;

segmenting a region of interest (ROI) from the target medical image or the second medical image;

obtaining a determination result by determining whether the ROI needs to be corrected using a judgment model, wherein the judgment model is a trained machine learning model and includes a first sub-model and a second sub-model, the first sub-model being configured to determine whether the ROI includes lesion, and the second sub-model being configured to determine whether the ROI includes image artifact; and determining whether the target medical image needs to be corrected based on the determination result, wherein the determining whether the ROI needs to be corrected using the judgment model includes:

determining whether the ROI needs to be corrected by inputting the ROI into the first sub-model and the second sub-model successively; or determining whether the ROI needs to be corrected by inputting the ROI into the second sub-model and the first sub-model successively; or determining whether the ROI needs to be corrected by inputting the ROI into the first sub-model and the second sub-model simultaneously.

2. The method of claim 1, further comprising:

generating a warped second medical image by warping the second medical image based on the registration information; and generating a fusion image by fusing the first medical image and the warped second medical image.

3. The method of claim 1, wherein the generating a pseudo-second medical image by transforming the first medical image includes:

generating the pseudo-second medical image by inputting the first medical image into a modality transformation model, wherein the modality transformation model is generated by training an initial model using a plurality of training samples, each of the plurality of training samples including a sample first medical image of a sample subject acquired using the first imaging modality and a sample second medical image of the sample subject acquired using the second imaging modality.

4. The method of claim 1, wherein the method further includes:

in response to determining that the target medical image needs to be corrected, correcting the target medical image.

5. The method of claim 1, wherein the first medical image of the target subject is generated based on the first scan data using a first reconstruction algorithm, and the method further includes:

generating a warped second medical image by warping the second medical image based on the registration information;

storing the warped second medical image into a storage device; and retrieving the wrapped second medical image from the storage device for reconstructing a third medical image of the target subject corresponding to the first imaging modality based on the first scan data using a second reconstruction algorithm, wherein the first reconstruction algorithm is different from the second reconstruction algorithm.

6. The method of claim 5, wherein the method further includes:

in response to detecting that the second medical image and the first medical image are generated, triggering the determination of the registration information and the generation of the warped second medical image.

7. The method of claim 5, wherein the method further includes:

in response to detecting that the warped second medical image is generated, triggering the reconstruction of the third medical image.

8. A method for image generation implemented on a computing device having at least one processor and at least one storage device, the method comprising:

obtaining a target medical image of a target subject;

segmenting a region of interest (ROI) from the target medical image;

obtaining a determination result by determining whether the ROI needs to be corrected using a judgment model, the judgment model being a trained machine learning model and including a first sub-model and a second sub-model, the first sub-model being configured to determine whether the ROI includes lesion, and the second sub-model being configured to determine whether the ROI includes image artifact;

determining whether the target medical image needs to be corrected based on the determination result; and in response to determining that the target medical image needs to be corrected, correcting the target medical image, wherein the determining whether the ROI needs to be corrected using a judgment model includes:

determining whether the ROI needs to be corrected by inputting the ROI into the first sub-model and the second sub-model successively; or determining whether the ROI needs to be corrected by inputting the ROI into the second sub-model and the first sub-model successively; or determining whether the ROI needs to be corrected by inputting the ROI into the first sub-model and the second sub-model simultaneously.

9. The method of claim 8, wherein the obtaining a target medical image of a target subject includes:

obtaining a first medical image and a second medical image of the target subject, the first medical image being generated based on first scan data collected using a first imaging modality, the second medical image being generated based on second scan data collected using a second imaging modality;

generating a pseudo-second medical image by transforming the first medical image, the pseudo-second medical image being a simulated image corresponding to the second imaging modality;

determining registration information between the first medical image and the second medical image based on the second medical image and the pseudo-second medical image; and generating the target medical image of the target subject based on the first medical image, the second medical image, and the registration information.

10. The method of claim 9, wherein the first medical image of the target subject is generated based on the first scan data using a first reconstruction algorithm, and the method further includes:

generating a warped second medical image by warping the second medical image based on the registration information;

storing the warped second medical image into a storage device; and retrieving the wrapped second medical image from the storage device for reconstructing a third medical image of the target subject corresponding to the first imaging modality based on the first scan data using a second reconstruction algorithm.

11. A method for image generation implemented on a computing device having at least one processor and at least one storage device, the method comprising:

obtaining a first medical image of a target subject, wherein the first medical image is generated based on first scan data using a first reconstruction algorithm, the first scan data being collected using a first imaging modality;

generating a warped second medical image by warping a second medical image based on registration information between the first medical image and the second medical image, the second medical image being generated based on second scan data collected using a second imaging modality; and reconstructing one or more third medical images of the target subject corresponding to the first imaging modality based on the first scan data and the warped second medical image, wherein each third medical image is reconstructed using a second reconstruction algorithm different from the first reconstruction algorithm, and in response to detecting that the warped second medical image is generated, the reconstruction of the one or more third medical images is triggered.

12. The method of claim 11, wherein the reconstructing one or more third medical images of the target subject corresponding to the first imaging modality based on the first scan data and the warped second medical image includes:

storing the warped second medical image into a storage device; and retrieving the wrapped second medical image from the storage device for reconstructing the one or more third medical images of the target subject corresponding to the first imaging modality based on the first scan data and the warped second medical image.

13. The method of claim 11, wherein the registration information is determined by:

generating a pseudo-second medical image by transforming the first medical image, the pseudo-second medical image being a simulated image corresponding to the second imaging modality; and determining the registration information between the first medical image and the second medical image based on the second medical image and the pseudo-second medical image.

14. The method of claim 11, wherein the method further includes:

generating a target medical image of the target subject based on the first medical image, the second medical image, and the registration information;

segmenting a region of interest (ROI) from the target medical image;

obtaining a determination result by determining whether the ROI needs to be corrected using a judgment model, the judgment model being a trained machine learning model and including a first sub-model and a second sub-model, the first sub-model being configured to determine whether the ROI includes lesion, and the second sub-model being configured to determine whether the ROI includes image artifact;

determining whether the target medical image needs to be corrected based on the determination result.

15. The method of claim 11, wherein the first scan data is positron emission tomography (PET) scan data, the first reconstruction algorithm is a filtered back projection (FBP) algorithm, and the second reconstruction algorithm is an iterative reconstruction algorithm.

16. The method of claim 11, wherein the one or more third medical images include multiple third medical images reconstructed using different second reconstruction algorithms.

17. The method of claim 11, wherein the first scan data is collected in a first scan of the first imaging modality, and the method further comprises:

obtaining third scan data of the target subject, the third scan data being collected in a second scan of the first imaging modality performed after the first scan;

retrieving the wrapped second medical image from the storage device; and reconstructing one or more fourth medical images of the target subject corresponding to the first imaging modality based on the third scan data and the warped second medical image.

18. The method of claim 11, wherein the method further includes:

in response to detecting that the second medical image and the first medical image are generated, triggering the determination of the registration information and the generation of the warped second medical image before the one or more third medical images are reconstructed.

\* \* \* \* \*